United States Patent
VanWyk et al.

(10) Patent No.: US 11,504,610 B2
(45) Date of Patent: Nov. 22, 2022

(54) DYNAMICALLY ENABLING OR DISABLING CONTROLS OF A CONTROLLER

(71) Applicant: Valve Corporation, Bellevue, WA (US)

(72) Inventors: Eric Judson VanWyk, Seattle, WA (US); Walter Petersen, Seattle, WA (US); John Ikeda, Seattle, WA (US); Benoit Collette, Seattle, WA (US); Richard Karstens, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 17/174,186

(22) Filed: Feb. 11, 2021

(65) Prior Publication Data

US 2021/0252386 A1    Aug. 19, 2021

Related U.S. Application Data

(60) Provisional application No. 62/977,038, filed on Feb. 14, 2020.

(51) Int. Cl.
*A63F 13/218* (2014.01)
*A63F 13/98* (2014.01)
*A63F 13/214* (2014.01)
*A63F 13/24* (2014.01)

(52) U.S. Cl.
CPC .......... *A63F 13/218* (2014.09); *A63F 13/214* (2014.09); *A63F 13/24* (2014.09); *A63F 13/98* (2014.09)

(58) Field of Classification Search
CPC ...... A63F 13/218; A63F 13/214; A63F 13/24; A63F 13/98
See application file for complete search history.

(56) References Cited

U.S. PATENT DOCUMENTS

| | | | |
|---|---|---|---|
| 6,570,078 B2 | 5/2003 | Ludwig | |
| 6,760,013 B2 * | 7/2004 | Willner | A63F 13/24 348/E5.103 |
| 8,754,746 B2 | 6/2014 | Lukas et al. | |
| 9,950,256 B2 | 4/2018 | Lim | |
| 10,427,035 B2 | 10/2019 | Schmitz et al. | |

(Continued)

OTHER PUBLICATIONS

PCT Search Report and Written Opinion dated May 3, 2021 for PCT application No. PCT/US21/17938, 6 pages.

(Continued)

*Primary Examiner* — Thomas J Hong
*Assistant Examiner* — Carl V Larsen
(74) *Attorney, Agent, or Firm* — Lee & Hayes, P.C.

(57) ABSTRACT

A handheld controller may include controls that are actuatable by a user. The handheld controller may further include one or more sensors that are configured to detect an object in proximity to certain controls, and/or that sense a grip or position of a hand on a handle portion of the controller. Based on data from a sensor(s), certain controls may be enabled and/or disabled. The sensors may therefore be used to determine which controls are being used or are intended to be used, and/or which controls are likely accessible or inaccessible to the user based on sensor data, and to cause one or more controls of the handheld controller to be enabled and/or disabled accordingly.

20 Claims, 17 Drawing Sheets

(56) References Cited

U.S. PATENT DOCUMENTS

| | | |
|---|---|---|
| 10,441,881 B2 | 10/2019 | Burgess et al. |
| 2006/0111180 A1 | 5/2006 | Cheng |
| 2008/0261695 A1 | 10/2008 | Coe |
| 2009/0205878 A1 | 8/2009 | Taylor |
| 2011/0306423 A1* | 12/2011 | Calderon .............. A63F 13/235 463/37 |
| 2012/0235949 A1 | 9/2012 | Ligtenberg |
| 2013/0212535 A1* | 8/2013 | Kim ...................... G06F 3/0484 715/841 |
| 2015/0105152 A1* | 4/2015 | Bellinghausen .... A63F 13/2145 463/31 |
| 2015/0248207 A1 | 9/2015 | Dorfner |
| 2016/0098107 A1* | 4/2016 | Morrell ................ G06F 3/0447 345/173 |
| 2017/0189800 A1 | 7/2017 | Crain |
| 2018/0272232 A1* | 9/2018 | Campbell ............. G06F 3/0416 |
| 2018/0300055 A1* | 10/2018 | Bynum ................. G06F 3/0416 |
| 2018/0329455 A1* | 11/2018 | Vesikivi ................ G06F 1/3262 |
| 2020/0144713 A1* | 5/2020 | Jung ..................... H04W 24/08 |
| 2020/0301517 A1* | 9/2020 | Monson ................ G06F 3/0219 |
| 2020/0353349 A1* | 11/2020 | Palmer ................... A63F 13/22 |
| 2021/0379486 A1* | 12/2021 | Ishikawa ................ A63F 13/22 |
| 2021/0405748 A1* | 12/2021 | Ishikawa ................ A63F 13/24 |
| 2022/0062756 A1* | 3/2022 | Lyden ..................... A63F 13/24 |

OTHER PUBLICATIONS

SlagCoin Instruction Manual for a Joystick Controller "SlagCoin Appendix—Joystick Controller" last updated Feb. 25, 2009 www.slagcoin.com/joystick.html 52 pages.

WICO Corporation Consumer Division Manual for "WICO Command Control" Trackball controller, 1982, 6 pages.

\* cited by examiner

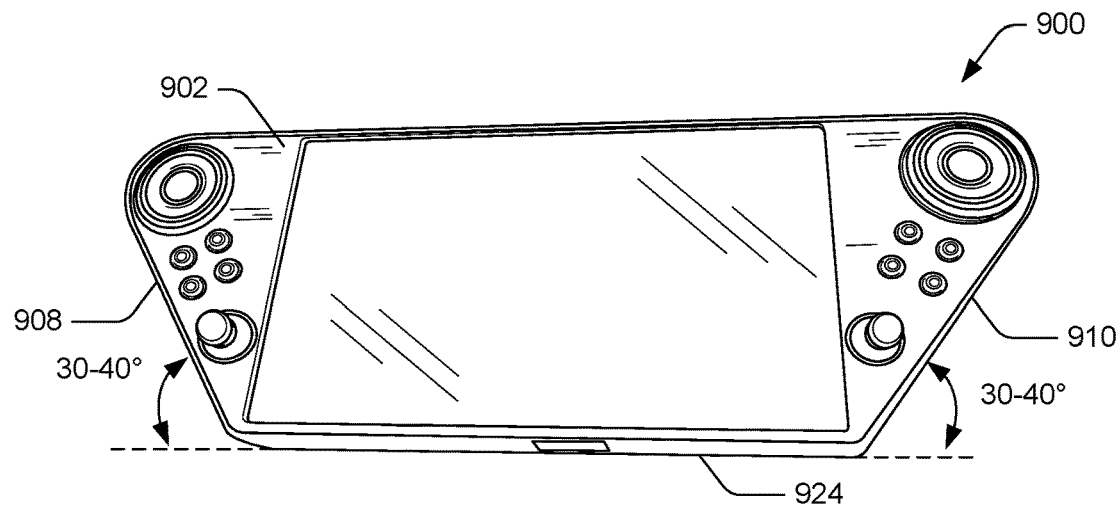
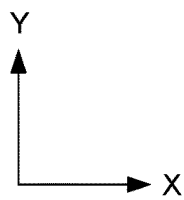
FIG. 10
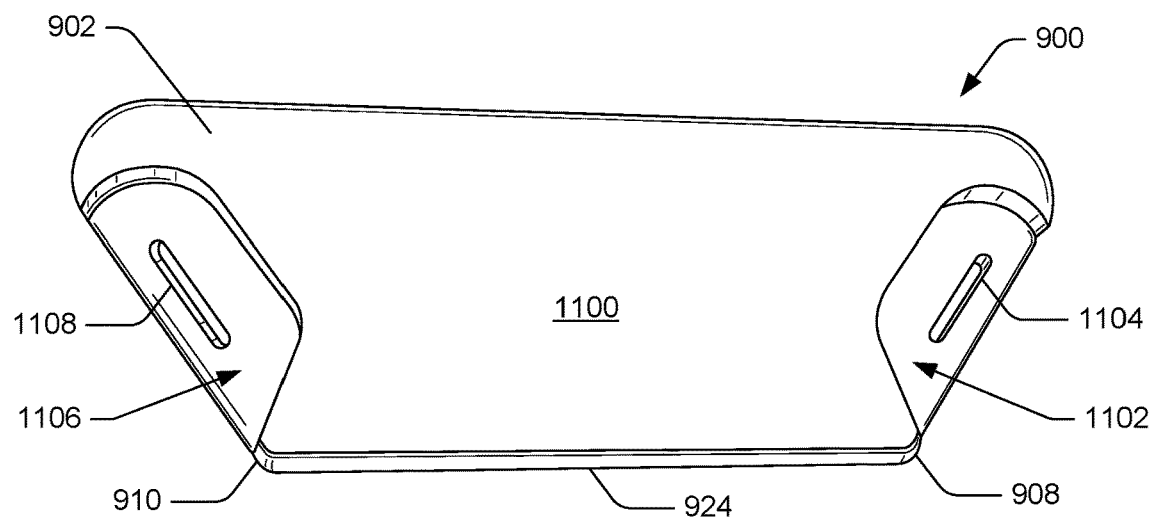
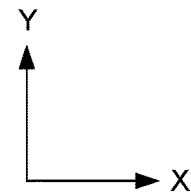
FIG. 11

DYNAMICALLY ENABLING OR DISABLING CONTROLS OF A CONTROLLER

CROSS REFERENCE TO RELATED APPLICATION

This application claims priority to commonly assigned U.S. Provisional Patent Application Ser. No. 62/977,038, entitled "CONTROLLER WITH VARIABLE GRIPS," and filed on Feb. 14, 2020, the entirety of which is incorporated herein by reference.

BACKGROUND

Handheld controllers are used in an array of architectures for providing input, for example, to a local or remote computing device. For instance, handheld controllers are utilized in the gaming industry to allow players to interact with a personal computing device executing a gaming application, a game console, a game server, the handheld controller itself, or the like. While current handheld controllers provide a range of functionality, further technical improvements may enhance user experiences that these controllers offer.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

FIG. 10 illustrates a front view of the handheld controller of FIG. 9, showing the handles removed from a body of the handheld controller.

FIG. 11 illustrates a rear view of the handheld controller of FIG. 9, showing the handles removed from the body of the handheld controller as well as slots for receiving the handles. The slots may receive the handles and the handles may slide within the slots, along at least a portion of the length of the sides, for improving ergonomics and/or providing access to one or more front-surface controls and/or one or more back-surface controls.

DETAILED DESCRIPTION

Figure 1:
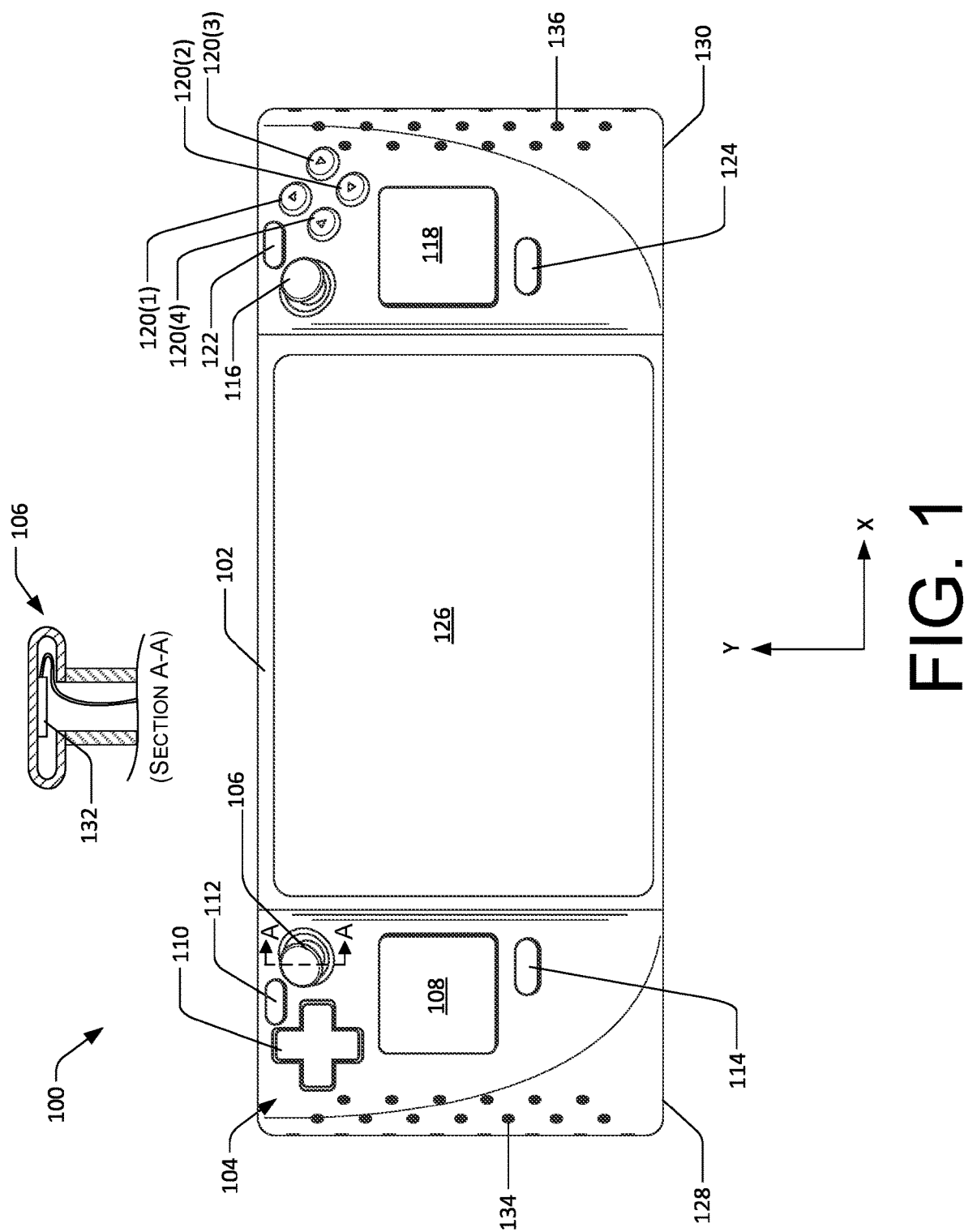
FIG. 1 illustrates a front view of an example handheld controller that includes, in part, one or more front-surface controls and one or more sensors that are usable for enabling and/or disabling one or more of the front-surface controls.

As mentioned above, handheld controllers are used in a range of environments and include a range of functionality. However, some traditional handheld controllers include a static configuration in terms of the controls operable by a user despite the fact that different users may have different configuration needs, grips, and/or preferences. Additionally, some controls may be inconveniently located on the and/or the shapes and contours of the handheld controller may be uncomfortable to hold for extended periods of time.

Described herein are, among other things, handheld controllers having various controls to engage in video game play via an executing video game application, and/or to control other types of applications and/or programs. In some instances, the handheld controller may include controls for controlling a game or application running on the handheld controller itself (e.g., a standalone, handheld gaming system that is substantially self-contained on the controller). In some instances, the handheld controller may include controls for controlling a remote device (e.g., a television, audio system, personal computing device, game console, etc.). The handheld controller may include one or more controls, including one or more front-surface controls on a front surface of a housing of the handheld controller. These front-surface controls may include one or more joysticks, directional pads (D-pads), trackpads, trackballs, buttons, or other controls that are controllable, for instance, by a thumb of a user operating the handheld controller. In some instances, one or more of the front-surface controls may be located within a particular half (e.g., a left half or a right half) of the front surface of the controller, and/or the front-surface controls may be located on or near handles of the housing. The handles may, in some instances, represent portions of the handheld controller that are gripped by the user, and which are disposed on opposing sides (or ends) of the handheld controller, such as on opposing sides of a centrally-located display.

Additionally, the handheld controller may include one or more sensors that are configured to detect an object in proximity to certain controls, and/or that sense a grip or position of a hand on the handle portion of the controller. The sensors may include, for example, proximity sensors (e.g., capacitive sensors) that are associated with a particular control or a particular set of controls. In some examples, the sensors may be disposed in and/or on a control. Additionally, or alternatively, the sensors may be disposed on and/or within the housing (e.g., the controller body) of the handheld controller. Based on data from a sensor(s), certain controls may be enabled and/or disabled. The sensors may therefore be used to determine which controls are being used or are intended to be used, and/or which controls are likely accessible or inaccessible to the user based on sensor data, and to cause one or more controls of the handheld controller to be enabled and/or disabled accordingly.

An example controller system may include a processor(s) and a controller including a first control, a second control, and a sensor associated with the first control and configured to detect an object in proximity to the first control. The controller system may further include logic configured to receive, from the sensor, data indicating that the object is in proximity to the first control, and to cause the second control to be disabled based at least in part on the data. By dynamically disabling a particular control(s) in this manner, spurious (unintended) inputs may be avoided. For example, if the user's palm accidentally touches the trackpad while the user's thumb is operating the joystick that is positioned near the trackpad, the disabled trackpad will not register an input based on the user's palm interacting with the trackpad. Additionally, or alternatively, dynamically disabling a particular control(s) may conserve computing resources of the controller system, such as, without limitation, power resources (e.g., battery), processing resources, network bandwidth, etc.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a front view of an example handheld controller 100. The controller 100 may be considered to be hand-held if it is operated by the hands of a user, whether or not the entire controller 100 is supported by or within the hands of the user. However, in accordance with various embodiments described herein, the terms "device," "handheld device," "handheld game device," "handheld console," "handheld game console," "controller," and "handheld controller" may be used interchangeably herein to describe any device like the controller 100.

The controller 100 may include a controller body 102 having a front surface 104. The controller body 102 may further include a back surface (or back), a top surface (or top edge, or top), a bottom surface (or bottom edge, or bottom), a left surface (or left edge, or left), and a right surface (or right edge, or right). Accordingly, the controller body 102 may be a cuboid. The front surface 104 and the back surface may be relatively large surfaces compared to the top, bottom, left, and right surfaces.

As illustrated in FIG. 1, the front surface 104 of the controller body 102 may include a plurality of controls configured to receive input of the user. Touch data generated by the controls may be used to detect a presence, location, and/or gesture of a finger of a user operating the controller 100. In some instances, the front surface 104 of the controller body 102 may include one or more front-surface controls that are, in some instances, controllable by one or more thumbs of the user operating the controller 100. Although not shown in FIG. 1, the handheld controller 100 may further include one or more top-surface controls residing on a top surface (or top edge) of the controller body 102. These top-surface controls may include, without limitation, triggers, bumpers, or the like, and the top-surface controls be controllable by one or more fingers of the user, such as a middle finger, an index finger, or the like. Additionally, or alternatively, the handheld controller 100 may include one or more back-surface controls residing on the back surface of the controller body 102 and operable by fingers of a left hand and/or a right hand of the user. Additionally, or alternatively, the handheld controller 100 may include one or more left-surface controls and/or right-surface controls residing on respective left and right surfaces of the controller body 102.

The front-surface controls may include one or more trackpads, trackballs, joysticks, buttons, directional pads (D-pads), or the like, as described in more detail below. For example, the front surface 104 may include a left joystick 106, a left trackpad 108, and/or a left D-pad 110 controllable by a left thumb of the user. In some embodiments, the front surface 104 may include additional left buttons controllable by the left thumb, such as the button 112 and the button 114. The front surface 104 may also include a right joystick 116, a right trackpad 118, and/or one or more right buttons 120(1)-(4) (e.g., X, Y, A, and B buttons) controllable by a right thumb of the user. In some embodiments, the front surface 104 may include additional right buttons controllable by the right thumb, such as the button 122 and the button 124. However, the front 104 may include other controls, such as tilting button(s), trigger(s), knob(s), wheel(s), and/or trackball(s), and the plurality of controls may be configured to receive input from any combination of thumbs and/or fingers of the user. In instances where the controller 100 includes trigger(s), the trigger(s) may be multi-direction triggers configured to be pushed away from the controller 100 and pulled towards the controller 100. Moreover, the controller 100 may include paddles, panels, or wings, that are configured to be pushed and/or pulled. The panels may be used to provide additional game controls to the controller 100, such as shifting in a racing game (e.g., pushing may downshift and pulling may upshift).

Figure 2:
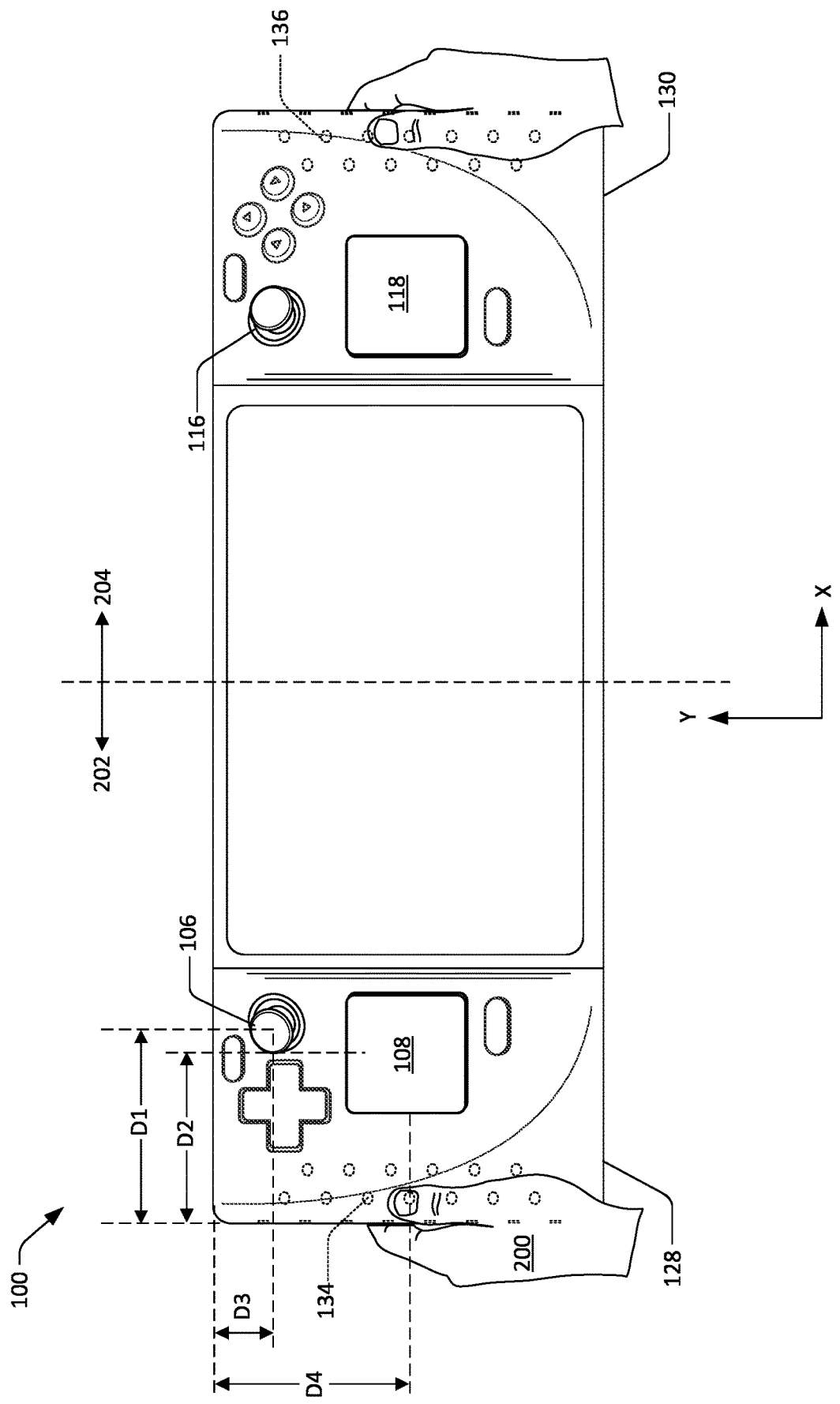
FIG. 2 illustrates the handheld controller of FIG. 1, showing a user gripping the handheld controller.

In some embodiments, the trackpads 108 and 118 are quadrilateral-shaped trackpads. For example, the trackpads 108 and 118 may be generally square-shaped trackpads. Furthermore, the quadrilateral-shaped trackpads 108 and 118 may have rounded corners. Additionally, as shown in FIGS. 1 and 2, a straight side edge of each trackpad 108 and 118 is aligned with (e.g., parallel to) the side (e.g., left and right) edges of a display 126 in a center of the controller body 102 on the front surface 104 of the controller body 102. As compared to circular trackpads, the quadrilateral-shaped trackpads 108 and 118 provide extra space at the corners that can be accessed by a finger (e.g., a thumb) of a user. Accordingly, the quadrilateral-shaped trackpads 108 and 118 may be more ergonomic than circular trackpads due to the extra area provided by the trackpads 108 and 118. For example, the quadrilateral shape of the trackpads 108 and 118 may give a user the ability to reorient his/her hands on the controller 100 and still access the trackpads 108 and 118 with his/her thumbs. Additionally, or alternatively, a user may choose to grip the controller body 102 in a slightly different way so that the corners of a trackpad (e.g., the trackpad 108 and 118) are used like the North, South, East, and West parts of the trackpad (e.g., like a diamond-shaped trackpad).

As mentioned, the front surface 104 may include a display 126. As shown, the display 126 may be located substantially within a center of the controller 100, interposed between the left controls and the right controls. The display 126 may be a touch-sensitive display capable of receiving touch input from a user. For example, the display 126 may present various interfaces, menus, and sub-menus and the user may provide selections through interacting with the display 126. The front surface 104 of the controller body 102 may include a generally flat, and planar, surface. The display 126 may be disposed on the planar surface, and, therefore, the display 126 may be substantially flat and planar across the front surface 104 of the controller body 102. In some instances, the controller 100 may include contours, shapes, and features that provide improved ergonomics and user comfort. For example, the front surface 104 may be contoured around the left and right edges, and more so near the bottom edge to accommodate hands grasping the controller body 102.

The controller body 102 may further include a left handle 128 and a right handle 130. The left handle 128 may be gripped by the left hand of the user and the right handle 130 may be gripped by the right hand of the user. FIG. 2 shows the controller 100 being grasped or otherwise held by hands of a user 200.

FIG. 1 illustrates that portions of the controller body 102 and/or the controls themselves (e.g., the front-surface controls) may further include sensors for determining or detecting an object(s) (e.g., a finger(s)) in proximity to a control(s), and/or for determining or detecting a grip or position of the hands of the user on the controller body 102. For example, the left joystick 106 and/or the right joystick 116 may each include a sensor(s) that is disposed in or on the joystick. For example, FIG. 1 illustrates a cross-section (A-A) of the left joystick 106 having a sensor 132 disposed in the joystick 106 to detect an object (e.g., a finger) in proximity to the joystick 106. Other controls including, without limitation, the left trackpad 108, the left D-pad 110, the right trackpad 118, and/or the right button(s) 120 may individually include a similar sensor(s) to the sensor 132. For example, the sensor 132 may include a proximity sensor or a touch sensor including, without limitation, a capacitive sensor, a resistive sensor, an infrared sensor, a touch sensor that utilizes acoustic soundwaves to detect a proximity of a finger, and/or another sensor for detecting the presence, location, and/or position of an object that is in proximity to the control, such as a finger of the user 200. By way of example, a capacitive sensor may sense a change in capacitance in response to the user's finger moving into proximity to a control of the sensor. The controller 100, or a communicatively coupled device, may determine this change in capacitance and determine that an object (e.g., a finger) is in proximity to (e.g., within a threshold distance from) a particular control. This determination may be based on a value (e.g., a capacitive value) sensed by the sensor 132 satisfying a threshold. In implementations that utilize capacitive-based sensing, the touch sensor(s) may include electrodes (e.g., a transmitter electrode and a receiver electrode of a transcapacitive-type sensor), and voltage can be applied to the electrodes so that the electrodes are configured to measure capacitance changes at the electrodes, which can be translated into sensor data in the form of capacitance values that are indicative of proximity of an object to the sensor(s) 132. For example, capacitance changes at the electrodes of a capacitive-based touch sensor(s) may be influenced by an object (such as the finger) that is in proximity to the electrodes.

FIG. 1 further illustrates that the left handle 128 may include first sensors 134 (e.g., a first array of sensors 134) disposed within the controller body 102 and/or on or within a surface thereof. Additionally, or alternatively, the right handle 130 may include second sensors 136 (e.g., a second array of sensors 136) disposed within the controller body 102 and/or on or within a surface thereof. These sensors may sense or determine a position of the hands on the handheld controller 100 and where the hand is gripping the handheld controller 100.

The first sensors 134 and the second sensors 136 are shown being spatially distributed or scattered across the respective handle portions 128 and 130 of the controller body 102 for sensing a grip(s) of the user's hand(s). For example, the first sensors 134 and/or the second sensors 136 may include proximity sensors or touch sensors including, without limitation, capacitive sensors, resistive sensors, infrared sensors, touch sensors that utilizes acoustic soundwaves to detect a proximity of a hand, and/or other sensors for detecting the presence, location, and/or position of objects that grip the controller 100, such as the hands of the user. By way of example, capacitive sensors may sense a change in capacitance in response to the user's hands gripping the left handle 128 and the right handle 130, adjacent to positions of the capacitive sensors (e.g., 134 and 136) that sense the change in capacitance. The controller 100, or a communicatively coupled device, may determine this change in capacitance and determine a grip or position of the left hand of the user on the left handle 128 and/or a grip or position of the right hand of the user on the right handle 130.

The first sensors 134 and the second sensors 136 are not necessarily of equal size and do not necessarily have equal spacing between them, although in some instances the sensors may be disposed in an array or grid with regular spacing and equal size. The sensors 134 and/or 136 may be embedded under the outer surface of the respective handle, or the controller body 102, where the outer surface includes an electrically insulative material.

Using the sensors, a processor(s) of the controller system disclosed herein can determine which control(s) the user is using or intends to use, as well as which controls are likely to be accessible or inaccessible to the thumbs or fingers. Based on this determination, certain controls of the controller 100 may be enabled and/or disabled appropriately. For example, knowing that the user is operating the left joystick 106 with a left thumb, certain other controls (e.g., the left trackpad 108) can be disabled (e.g., their inputs may be ignored). As another example, knowing the grip or position of the hands of the user 200, certain controls are likely to be inaccessible to the user 200 based on their hand position. In response, these likely inaccessible controls may be disabled (e.g., their inputs may be ignored). As such, the controller 100 may be configured (e.g., in terms of which controls to enable and which controls to disable) according to controls that are being touched or hovered over by a finger, and/or according to a grip or position of the user's hands, and/or how the user holds the controller 100 in his or her hands.

FIG. 2 illustrates a user 200 holding the controller 100. The act of holding and/or using the controller 100, as shown in FIG. 2, may cause one or more controls to be enabled and/or disabled. In some examples, controls may be enabled by default (e.g., when the controller 100 is powered on) regardless of the grip of the user's hands on the controller 100, and the controls may be configured to be disabled thereafter based on one or more criteria. For example, a control may be disabled after a timeout without being used or touched for a period of time. Additionally, or alternatively, a control may be disabled based on data received from one or more sensors of the controller 100, as described herein. As shown in FIG. 2, the user 200 may hold the left handle 128 and the right handle 130 at respective positions. The position of the hands of the user 200 on the controller 100 may be sensed by corresponding sensors of the first sensors 134 and corresponding sensors of the second sensors 136. For example, at least a subset of the first sensors 134 disposed beneath the left hand of the user 200 may sense a change in capacitance, and at least a subset of the second sensors 136 disposed beneath the right hand of the user 200 may detect a change in capacitance. The change in capacitance detect by these sensors may be used for determining a grip or position of the user's 200 hands on the left handle 128 and the right handle 130, respectively. For example, the sensor data may indicate which sensors detect a change in capacitance, and based on which sensors detect such a change in capacitance, a determination can be made as to whether a position of a hand is closer to the top edge of the controller body 102 than a bottom edge of the controller body 102, or vice versa. In turn, this grip or hand position may be utilized to enable and/or disable certain controls of the controller 100.

Figure 5A:
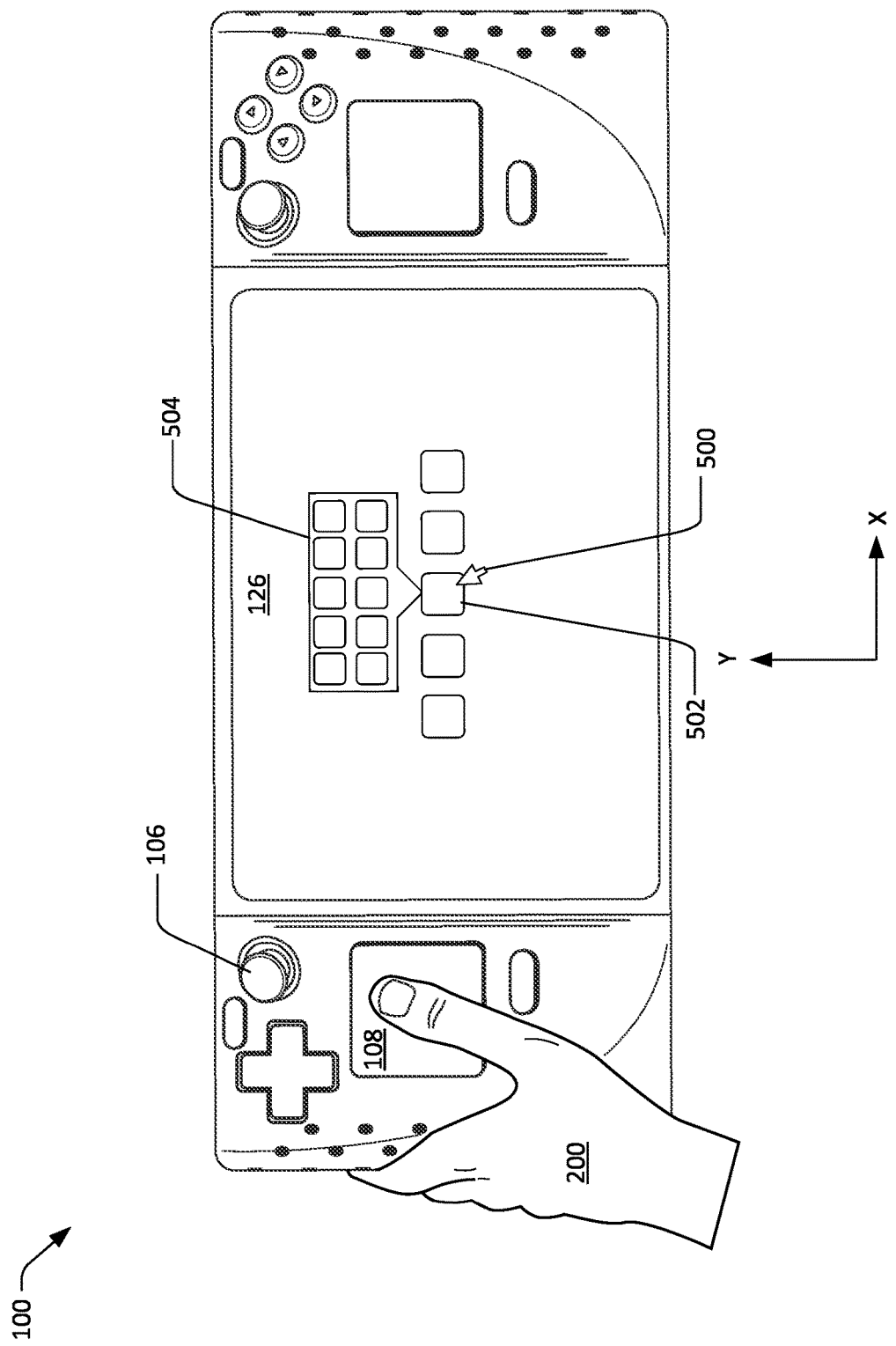
FIG. 5A illustrates the handheld controller of FIG. 1, showing a user touching (e.g., operating) a left trackpad with a left thumb, and a user interface (UI) presented on the display in a mouse mode.
Figure 5B:
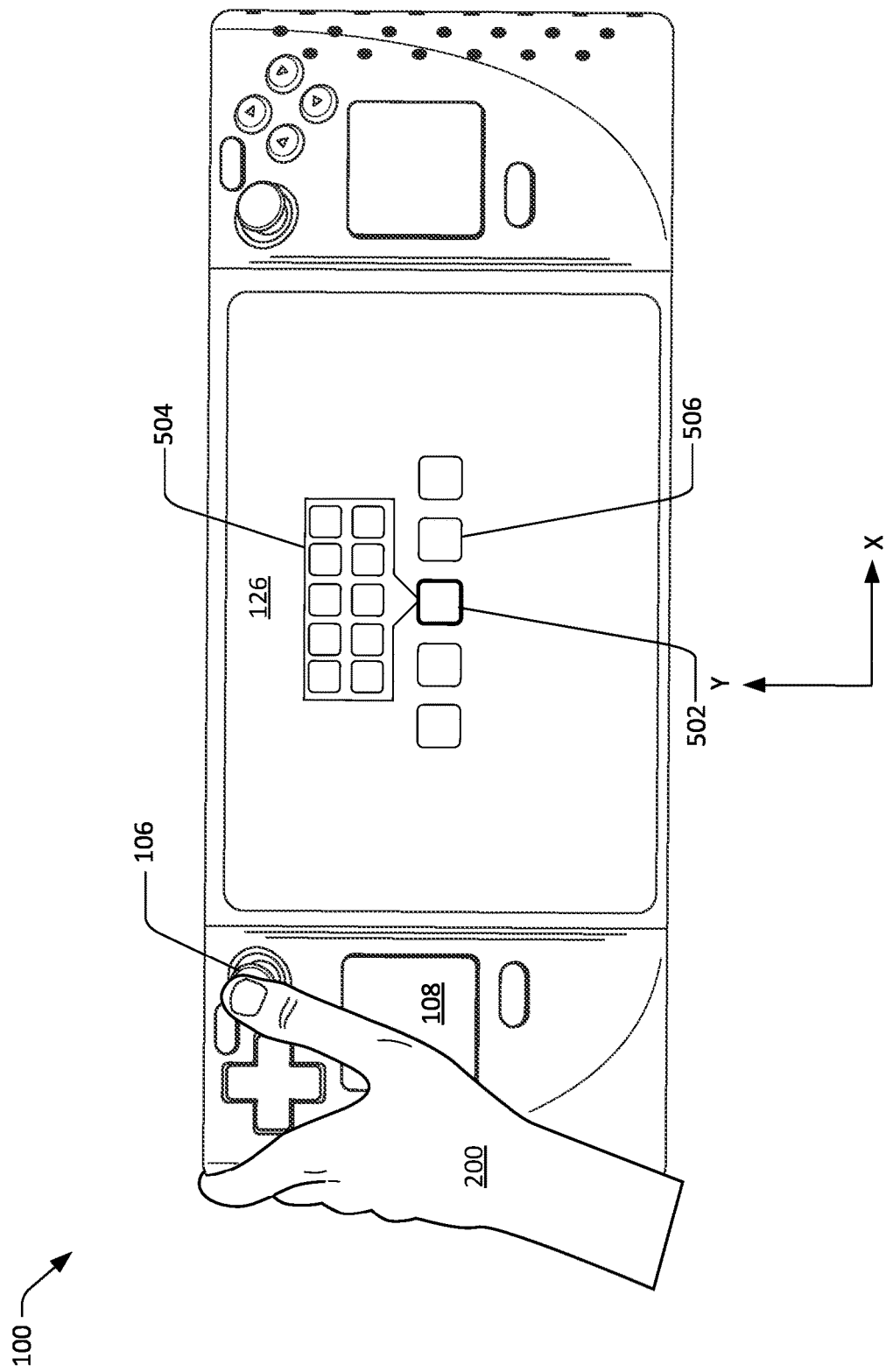
FIG. 5B illustrates the handheld controller of FIG. 1, showing a user moving the left thumb from the left trackpad to the left joystick, and changing the UI mode to a selector mode based at least in part on disabling the left trackpad.

Additionally, or alternatively, if the user 200 extends or otherwise moves a thumb over or near the left joystick 106, for example, the sensor 132 disposed in the left joystick 106 may detect the thumb in proximity thereto, such as by sensing a change in capacitance, and this change in capacitance detected by the sensor 132 may be used to enable and/or disable certain controls of the controller 100. In an illustrative example, if the user's 200 thumb moves into proximity to the left joystick 106 (as detected by the sensor 132), this may cause another control, such as the left trackpad 108 to be disabled (e.g., inputs of the left trackpad 108 may be ignored). This is useful, in part, because the palm of the user's 200 hand may touch the trackpad 108 when the user 200 reaches for the joystick 106 with his/her thumb. This scenario is illustrated in FIG. 5B. In order to ignore or disregard spurious input via the trackpad 108 by the user's 200 palm, the trackpad 108 can be disabled based on the detection of the thumb on or near the joystick 106, which implies that the user 200 is currently using, or intends to use, the joystick 106 in lieu of using the trackpad 108. This is the case with the example controller 100 because of the way the user 200 is expected to hold the controller 100, as well as the fact that the front-surface controls are to be actuated using the thumbs. That is, the left thumb may access one front-surface control at a time on a left half 202 of the controller body 102, while the right thumb may access one front-surface control at a time on the right half 204 of the controller body 102 at a time. Additionally, the positioning of the front-surface controls on the front surface 104 may dictate which controls to enable or disable based on sensor data. Take the left joystick 106 as an example. The left joystick 106 is positioned on the front surface 104 at a first distance, D1, from a left side edge of the controller body 102. Meanwhile, the left trackpad 108 is positioned on the front surface 104 at a second distance, D2, from the left side edge of the controller body 102, and the second distance, D2, less than the first distance, D1. In other words, the left joystick 106 is positioned farther inward from the left side edge than the left trackpad 108. Furthermore, the left joystick 106 is positioned on the front surface 104 at a third distance, D3, from the top edge of the controller body 102. Meanwhile, the left trackpad 108 is positioned on the front surface 104 at a fourth distance, D4, from the top edge of the controller body 102, and the fourth distance, D4, is greater than the third distance, D3. In other words, the left trackpad 108 is positioned farther inward from the top edge than the left joystick 106. These relative positions of the front-surface controls may dictate which controls to disable based on sensor data because the user's 200 hand, or portions thereof, may have to move over particular controls in order to access another control with a thumb.

The processes described herein are illustrated as collections of blocks in logical flow diagrams, which represent a sequence of operations, some or all of which may be implemented in hardware, software, firmware or a combination thereof (sometimes referred to herein as "logic"). In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 3:
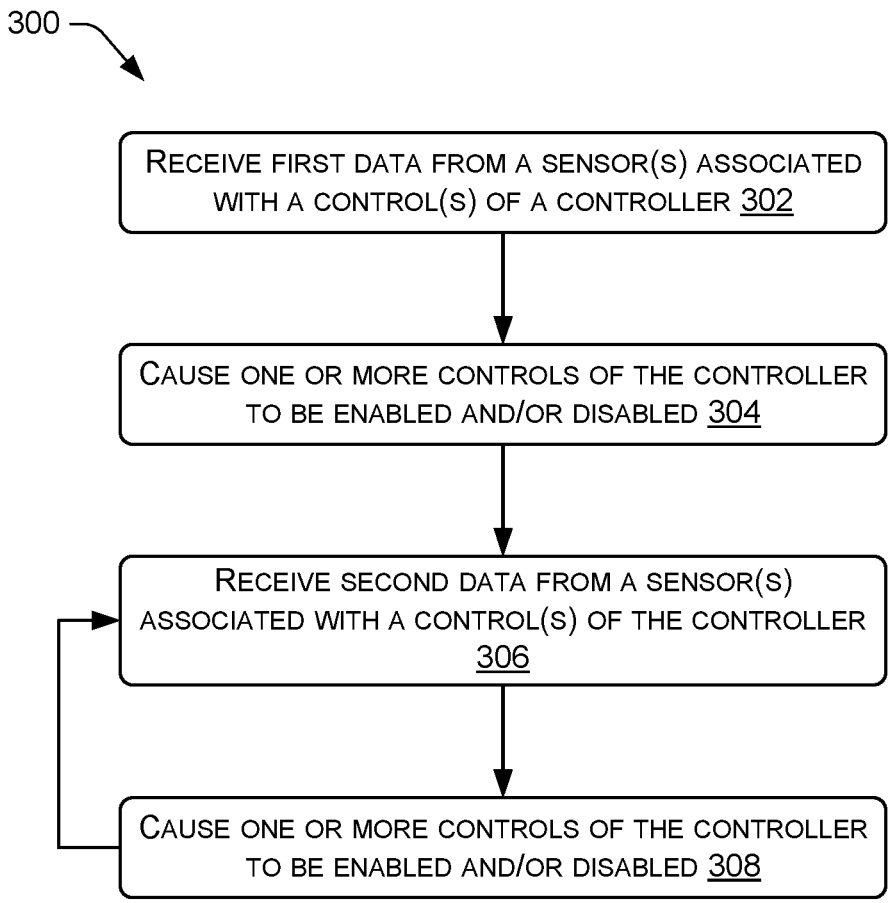
FIG. 3 illustrates an example process for enabling and/or disabling certain controls of a controller based at least in part on sensor data.

FIG. 3 illustrates an example process 300 for enabling and/or disabling certain controls of a controller 100. In some instances, the process 300 may be performed by the controller 100 and/or a remote device communicatively coupled to the controller 100.

At 302, a processor(s) of a controller system, as disclosed herein, may receive first data from a sensor(s) associated with a control(s) of a controller 100. The sensor(s) from which the first data is received at block 302 may be any of the sensors described herein, such as a sensor disposed in or on a control and configured to detect an object in proximity to the control. An example of such a sensor is the sensor 132 disposed in the joystick 106 to detect an object (e.g., a finger/thumb) in proximity to the joystick 106. In another example, the first data may be received at block 302 from at least a subset of the first sensors 134 and/or at least a subset of the second sensors 136, which are spatially distributed across the handle portions 128 and 130 of the controller body 102. For example, a user 200 operating the controller 100 may grip handles (e.g., a left handle 128 and a right handle 130) in a particular manner, and sensors (e.g., at least some of the sensors 134 and/or 136) may detect, or generate data, indicative of the grip or position of a hand(s) of the user 200 on the controller body 102 of the controller 100, and/or the received data may be indicative of a proximity of the user's 200 thumb(s) to a particular front-surface control(s). In some instances, the sensors may be disposed in, on, and/or within respective handles 128, 130 of the controller 100 for determining the grip of the user 200. For example, first sensors 134 in or on a left handle 128 may detect a grip of the left hand of the user 200 on the left handle 128, while second sensors 136 in or on the right handle 130 may detect a grip of the right hand of the user 200 on the right handle 130. In some instances, the sensor(s) from which the first data is received at block 302 may include a capacitive sensor(s) that detects a change of capacitance when an object is in proximity to the capacitive sensor(s) (e.g., when the user's 200 thumb touches the top surface of the joystick 106, and/or when hands of the user 200 are disposed over or adjacent to the first sensors 134 and the second sensors 136, respectively. For example, data generated by a sensor disposed in or on a control (e.g., a front-surface control) disposed on a left half 202 of the controller body 102, and/or data generated by the first sensors 134, may indicate which of those sensors sense or detect a change in capacitance. Additionally, data generated by a sensor disposed in or on a control (e.g., a front-surface control) disposed on a right half 204 of the controller body 102, and/or data generated by the second sensors 136 may indicate which of those sensors sense or detect a change in capacitance. This sensor data may be used to understand how the user 200 is holding the controller 100 in his/her hands. As noted above, in some instances, the controller 100 or a remote device may detect an object in proximity to a control and/or determine the grip or position of a hand(s) of the user 200 on the controller body 102. If the remote device is the device detecting the object or determining the grip or position of the hand(s), the controller 100 may transmit the sensor data to the remote device and the remote device may process the provided sensor data to detect the proximate object and/or determine the grip or position of the hand(s) of the user.

At 304, the processor(s) may cause one or more controls of the controller 100 to be enabled and/or disabled. For example, if the sensor data received at block 302 indicates that an object is in proximity to a particular control (e.g., the left joystick 106), a certain control(s) (e.g., the left trackpad 108) may be disabled. Determining that an object is in proximity to a particular control may include determining that the sensor data includes a value (e.g., a capacitive value) that satisfies a threshold. A threshold may be satisfied by a value if the value is equal to or greater than, or strictly greater than the threshold. Alternatively, a threshold may be satisfied by a value if the value is equal to or less than, or strictly less than the threshold. In the illustrative example of disabling the left trackpad 108, the left trackpad 108 may be disabled based on the notion that the user 200 is not intending to use the trackpad 108 if the user is currently using, or intends to use, the joystick 106. As another example, if the sensor data is indicative of a grip or position of the hand(s) of the user 200 on the handle portions 128, 130 of the controller body 102, certain controls may be likely accessible while certain other controls may be likely inaccessible. In other words, using the data provided by the array(s) of sensors 134 and/or 136, the process 300 may determine which controls are likely accessible and which controls are likely inaccessible. In this regard, particular subsets of the first sensors 134 may be associated with one or more particular front-surface controls on the left half 202 of the controller body 102, and particular subsets of the second sensors 136 may be likewise associated with one or more particular front-surface controls on the right half 204 of the controller body 102. In this manner, a sensor does not have to be in or on a control to be associated with the control. In some instances, the left handle 128 of the controller body 102 may include first controls and the right handle 130 of the controller body 102 may include second controls. The processor(s) may utilize the sensor data generated by the first sensors 134 of the first handle 128 and second sensors 136 of the second handle 130 to enable and/or disable corresponding controls. Accordingly, the enabled controls on the left handle 128 may be likely accessible by the left hand (e.g., the left thumb) and the enabled controls on the right handle 130 may be likely accessible by the right hand (e.g., the right thumb). In some instances, the controller 100 may determine which controls to enable and/or disable. Additionally, or alternatively, the controller 100 may receive, from the remote device, indications of which controls to enabled and/or disable.

From time to time, the user 200 may adjust his or her grip on the controller 100 and/or may configure the controller 100 for different games, applications, and/or experiences. In doing so, the controls of the controller may be enabled and/or disabled. For example, at 306, the processor(s) may receive second data from a sensor(s) associated with a control(s) of a controller 100. Again, the sensor(s) from which the second data is received at block 306 may be a sensor(s) disposed in or on a control (e.g., a sensor disposed in the trackpad 108) and configured to detect an object in proximity to the control, and/or at least a subset of the first sensors 134 and/or at least a subset of the second sensors 136, which are spatially distributed across the respective handle portions 128, 130 of the controller body 102. The user 200 operating the controller 100 may grip handles 128, 130 in a particular manner and place a thumb(s) over a particular front-surface control(s), and one or more sensors may detect, or generate data, indicative of an object in proximity to a control and/or the grip or position of hands on the handles 128, 130 of the controller body 102. With capacitive sensors, data generated by the sensors may indicate which sensors, among the sensors, sense or detect a change in capacitance, and this capacitance data may be used to understand how the user 200 holds the controller 100 and/or what control(s) the user 200 is presently using or intends to use.

At 308, the processor(s) may cause one or more controls of the controller 100 to be enabled and/or disabled. For example, if the second data received at block 306 indicates that the object previously in proximity to the left joystick 106 is now in in proximity to the left trackpad 108, the left joystick 106 may be disabled based on the notion that the user 200 does not intend to use the joystick 106 if the user 200 is using, or intends to use, the trackpad 108. As another example, based at least in part on the grip or position of the hand(s) of the user 200 on the handle portions 128, 130 of the controller body 102, certain controls may be likely accessible while certain other controls may be likely inaccessible. In some instances, the one or more controls enabled and/or disabled at 308 may be different than, or similar to, the one or more controls enabled and/or disabled at 304. For example, certain controls may remain enabled through an iteration of blocks 302-308, while certain controls may remain disabled through the iteration of blocks 302-308. Additionally, certain controls transition from being enabled to being disabled through the iteration of blocks 302-308, or vice versa. As such, using data generated by the sensors, the process 300 may determine which controls are likely accessible, being used, and/or intended to be used, and/or which controls are likely inaccessible, not being used, and/or not intended to be used. The process 300 may utilize the data generated by the sensors of the controller 100 to enable and/or disable corresponding controls. From 308, the process 300 may loop to 306 whereby the process 300 may continue to receive additional data from sensors associated with particular controls or sets of controls, and enabling and/or disabling certain controls of the controller.

Figure 4:
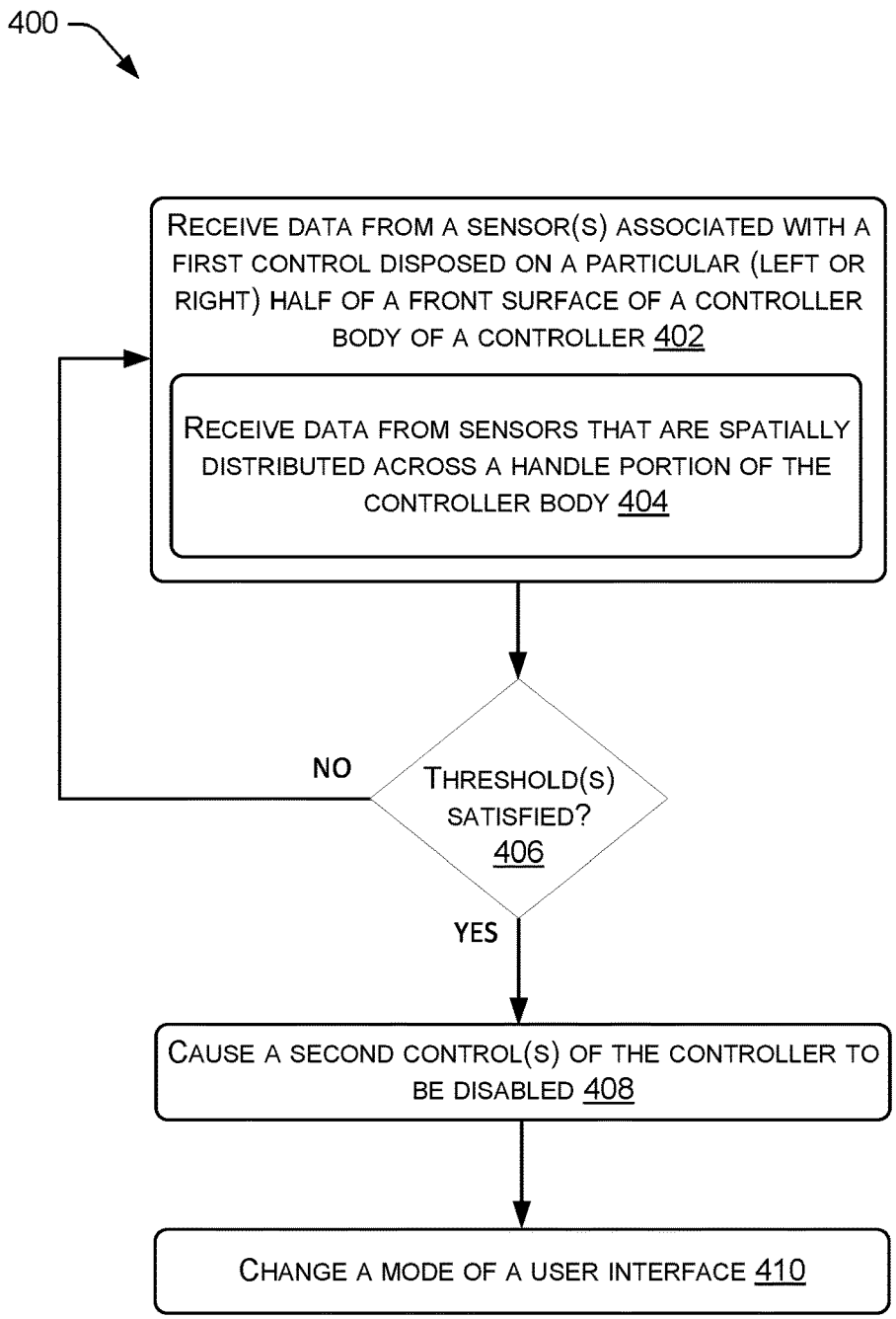
FIG. 4 illustrates another example process for disabling a control of a controller based at least in part on sensor data.

FIG. 4 illustrates another example process 400 for disabling a control of a controller 100 based at least in part on sensor data. In some instances, the process 400 may be performed by the controller 100 and/or a remote device communicatively coupled to the controller 100.

At 402, a processor(s) of a controller system disclosed herein may receive data from a sensor(s) associated with a first control disposed on a particular half (e.g., a left half 202 or a right half 204) of a front surface 104 of a controller body 102 of a controller 100. The sensor data received at block 402 may indicate that an object is in proximity to the first control. In some examples, the sensor(s) may include a capacitive sensor(s) disposed in or on the first control, and the sensor data may include capacitance data indicating a change in capacitance based on the object moving into proximity to the first control. In an illustrative example, the first control may be the left joystick 106, and the sensor(s) may be a proximity sensor 132 disposed in the left joystick 106.

At sub-block 404, the processor(s) may receive, from an array of sensors (e.g., the sensors 134 and/or 136) that are spatially distributed across a handle portion of the controller body 102, second data indicating a position of a hand on a particular handle portion (e.g., left handle 128 or right handle 130) of the controller body 102. The second data may indicate that the position of the hand is closer to a top edge of the controller body 102 than a bottom edge of the controller body 102, or vice versa, which may indicate which controls (e.g., which front-surface controls) are likely accessible and/or inaccessible to the user 200 based on the hand position. For example, if the user's 200 left hand is determined to be closer to a top edge than a bottom edge of the controller body 102 (e.g., by a particular subset of the first sensors 134 detecting the hand), this may indicate that the joystick 106 and the D-pad 110 are likely accessible, and, therefore, the algorithm may determine to enable those "higher-up" controls, or leave them enabled if they are already enabled. Conversely, if the user's 200 left hand is determined to be closer to the bottom edge than the top edge of the controller body 102, this may indicate that the joystick 106 and the D-pad 110 are likely inaccessible, and, therefore, the algorithm may determine to disable those "higher-up" controls. In some embodiments, an individual sensor array 134 or 136 may be divided into zones on the handle 128 or 130, such as top, bottom, and possibly intermediate (e.g., middle) zones that run along the size edge, and/or zones that run inward from the side edge, such as an outer zone, an inner zone, and possibly an intermediate zone(s) therebetween. In this configuration, a hand that predominantly covers the sensors in a particular zone may help determine a hand position or grip of the user's 200 hand.

At 406, the processor(s) may determine, based at least in part on the sensor data (e.g., capacitance data) received at block 402, whether a value(s) (e.g., a capacitive value) sensed by the sensor(s) satisfies a threshold(s) and/or whether the value(s) is/are within a predefined range of values. If this condition is satisfied, for example, it may be indicative of an object (e.g., a finger/thumb) contacting a surface of the first control and/or a hand being in a position on the handle to access the first control. If the threshold(s) is/are satisfied, the process 400 may follow the YES route from block 406 to block 408. In some embodiments, the threshold may be satisfied at block 406 based on the array of sensors 134 and/or 136 corroborating a signal detected by a sensor that is in or on the first control. That is, if a weak (e.g., below-threshold) signal is detected by a sensor in or on the first control, but a subset of the array of sensors 134 or 136 indicates a hand position where that first control is likely accessible to the user, this corroborating signal from the sensor array may be enough to satisfy the threshold at block 406, in some embodiments.

At 408, the processor(s) may cause a second control(s) to be disabled based at least in part on the sensor data received at block 402 (and possibly based on the sensor data received at sub-block 404), the second control(s) disposed on the same, particular half of the front surface 104 where the first control is disposed. Continuing with the illustrative example where the first control is the left joystick 106, the second control that is disabled at block 408 may be the left trackpad 108, because the left joystick 106 and the left trackpad 108 are both in the same half (i.e., the left half 202) of the front surface 104 of the controller body 102. In addition, as illustrated in FIG. 2, the left joystick 106 is positioned farther in and farther up on the front surface 104 than the left trackpad 108, which means that the user's 200 hand (e.g., palm) may touch and/or hover over the left trackpad 108 when accessing the left joystick 106. By disabling the left trackpad 108, in this example, inputs via the left trackpad 108 may be ignored or disregarded while the user 200 is operating the left joystick 106. This prevents spurious inputs that are unintended, and it conserves computing resources (e.g., power resources, processing resources, network bandwidth, etc.) by effectively turning off the second control. In some examples, the second control is disabled at block 408 based on the determination at block 406 in the affirmative that a threshold(s) is satisfied by a value(s) in the sensor data. For example, if a capacitance value measured by the sensor(s) associated with the first control is high (e.g., above a threshold), this may cause the second control to be disabled. The second control may cease to be disabled (or may be re-enabled again) as soon as a sensor associated with the second control provides data indicating that the user's 200 finger has moved in proximity to the second control and/or that a grip or hand position of the user 200 is such that the second control is to be re-enabled. Alternatively, the second control may cease to be disabled in response to a sensor associated with the first control indicating that the user's 200 finger is no longer in proximity to the first control.

At 410, and based on disabling the second control(s), the processor(s) may change a mode of a user interface presented on a display 126 of the controller 100 based at least in part on the causing of the second control to be disabled. An example of this is illustrated in FIGS. 5A and 5B. If, at block 406, a threshold(s) is not satisfied by a value(s) of the sensor data, the process 400 may follow the NO route from block 406 to block 402 where additional sensor data may be received to iterate the process 400 while the controller 100 is used over a period of time (e.g., during gameplay of a video game).

FIG. 5A illustrates the handheld controller 100 of FIG. 1, showing a user 200 touching (e.g., operating) a left trackpad 108 with a left thumb, and a user interface (UI) presented on the display 126 in a mouse mode. In FIG. 5A, the user's 200 thumb is over (e.g., contacting) the left trackpad 108. A sensor (e.g., a capacitive array) in or on the trackpad 108 may detect the proximity of the user's 200 thumb, which may cause another control(s) (e.g., the left joystick 106) to be disabled, as described herein. In this configuration, the UI mode may be a mouse mode, where movement of the user's 200 thumb on the trackpad 108 causes corresponding movement of a mouse or pointer 500 on the display 126. FIG. 5A shows the user hovering the pointer 500 over a UI element 502, which causes a pop-up UI element 504 to be presented next to (e.g., above) the UI element 502 the pointer 500 is hovering over. As shown in FIG. 5B, when the user moves his/her thumb over (e.g., in contact with) the left joystick 106, the sensor 132 disposed in the joystick 106 may detect the thumb in proximity to the joystick 106 (e.g., the sensor 132 may sense an above-threshold capacitive value), and a processor(s) of the controller system may cause the left trackpad 108 to be disabled based on the sensor data received from the sensor 132 disposed in the left joystick 106. Based on disabling the left trackpad 108 and/or detecting the thumb in proximity to the joystick 106, the processor(s) may change the mode of the UI to a different mode, such as from the mouse mode to a selector mode. In the selector mode, movement of the joystick 106 may cause a selector to toggle or switch between UI elements presented on the display 126. In the example of FIG. 5B, the selector is currently associated with the UI element 502. If the user were to deflect the joystick 106 to the right, the selector may toggle or switch to an adjacent UI element 506 to the right of the UI element 502. The user 200 touching the D-pad 110 may have a similar effect. That is, moving from the left trackpad 108 to the left D-pad 110 may cause a change in the UI mode from a mouse mode to a selector mode. Furthermore, the pop-up UI element 504 may still be presented next to (e.g., above) the UI element 502 that is currently selected while the UI is in the selector mode. In this way, the user 200 can seamlessly switch between different UI modes without having to go into a settings menu to change the UI mode. The processor(s) of the controller system dynamically changes the UI mode using the sensor(s) associated with the controls of the controller 100 in order to select the appropriate UI mode, as described herein.

Figure 6:
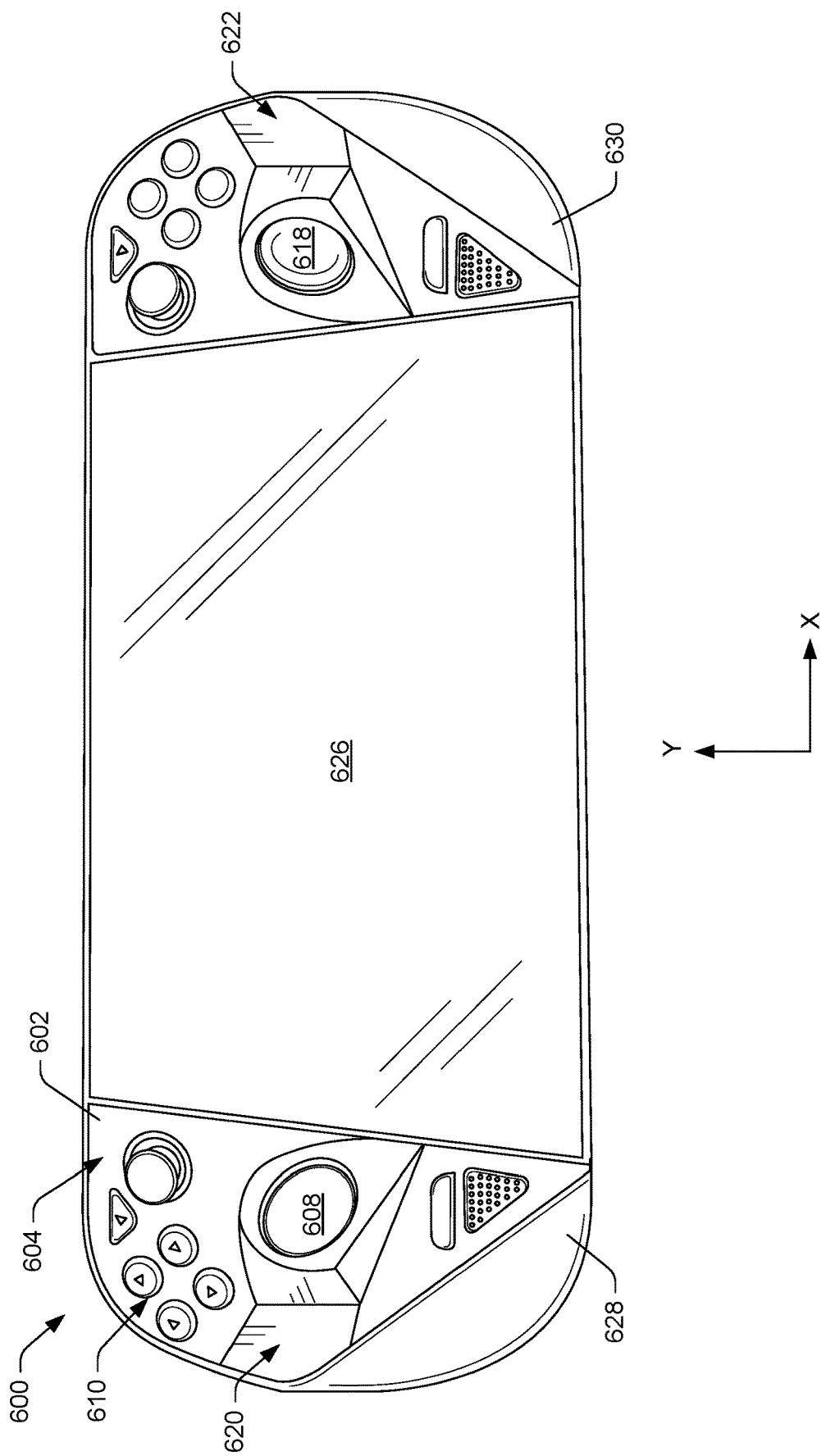
FIG. 6 illustrates a front perspective view of an example handheld controller having a controller body that includes a generally flat, planar front surface, and angled portions on the front surface that are angled relative to the flat, planar portions of the front surface. One or more of the front-surface controls may be disposed on the angled portions of the front surface for improved ergonomics.

FIG. 6 illustrates an example controller 600 having a controller body 602 that includes a generally flat, planar front surface 604, as well as angled portions on the front surface that are angled relative to the flat, planar portions of the front surface 604. One or more of the front-surface controls may be disposed on the angled portions of the front surface 604 for improved ergonomics. In some instances, the controller 600 may include similar features or components as the controller 100. For example, the controller body 602 may include a left handle 628 and a right handle 630, and at least some similar front-surface controls (e.g., joysticks, buttons, etc.). As compared to the controller 100, however, the trackpads 608 and 618 may be circular in shape, a the left handle 628 includes a different form of D-pad (i.e., four distinct buttons including up, down, left, and right buttons). FIG. 6 illustrates how the handles 628, 630 may include angled portions or recessed regions that may be sloped or angled away from other portions of the housing, or relative to other portions of the handles. In some instances, the angled portions may represent areas or recessed regions (e.g., pockets) within the left and right handles 628 and 630, respectively, of the handheld controller 600. The recessed regions of the left handle 628 and the right handle 630 may be located on the front 604 of the housing, between a top edge of the controller 600 and a bottom edge of the controller 600. In some instances, the recessed regions may extend from a perimeter of the controller 600, such as a left side and a right side of the controller 600, respectively, towards a center of the controller 600. In such instances, the recessed regions may be located to the left and the right of a display 626 of the controller, respectively.

By including one or more of the front-surface controls on the portions of the handles 628, 630 that are angled relative to the flat, planar portions of the handles, access to the controls and/or user comfort may be increased or improved when operating the handheld controller 600. For example, the trackpads 608 and 618 may be disposed within the recessed regions, on angled portions, to increase an accessibility of the trackpads 608, 618 by the thumbs of the user 200. The angled portions may also be oriented in a direction towards the user 200, or at least towards the user's hands. For example, the angled portions within the recessed regions may orient a left trackpad 608 towards a bottom left corner of the housing of the controller 600 and a right trackpad 618 towards a bottom right corner of the housing of the controller 600. In some instances, the angled portions of the recessed regions, or angled portions, may be sloped at an angle of about 30-40 degrees relative to the flat, planar portions of the front surface. In some instances, the angled portions may be sloped at an angled of about 30-40 degrees relative to one or more planes of the housing of the controller body 602. In such instances, the one or more front-surface controls may be oriented normal to the angled portions such that the one or more front-surface controls are oriented at an angle relative to the generally planar front surface 604 of the controller 600. However, in some instances, one or more of the front-surface controls may not be located on the angled portions, but adjacent to the angled portions, and which are accessible by left and right fingers of the user. For example, the trackpads 608 and 618 on the left and right handles 628 and 630 may be disposed on the angled portions within the recessed region, while the joysticks or buttons on the left and right handles 628, 630 may be disposed on portions that are relatively planar with the front surface 604, external to the recessed regions.

FIG. 6 shows the left handle 628 and/or the right handle 630 as including recessed regions disposed into, and/or projections that project out from, the controller body 602 (Z-direction). For example, FIG. 6 illustrates that the left handle 628 may include recessed region 620 and that the right handle 630 may include a recessed region 622. The recessed regions 620, 622 may include portions that are sloped or angled relative to other portions of the front 604 that are flat, but not angled (e.g., coplanar, or at least parallel to a plane of the display 626). As shown, the recessed regions 620, 622 may be disposed between a top of the controller body 602 and a bottom of the controller body 602. The recessed regions 620, 620 may also be disposed between side edges of the controller body 602 and the display 626. For example, the recessed region 620 may extend from a left side or edge of the controller body 602 towards the display 626 and/or the recessed region 622 may extend from a right side or edge of the controller body 602 towards the display 626. In some embodiments, the recessed regions 620, 622 may not extend all the way to the side edges of the controller and/or all the way to the edge of the display 626.

In some instances, the recessed regions 620, 622 may be sized and configured for accommodating thumbs of a user. For example, the recessed region 620 may accommodate or receive a left thumb of the user 200, while the recessed region 622 may accommodate or receive a right thumb of the user 200. In some instances, at least part of the recessed region 620 and/or at least part of the recessed region 622 may be sloped or angled away from the front planar surface 604 between about 30 degrees to about 40 degrees. Sloping the recessed region 620 and/or recessed region 622 in this manner may increase a user comfort when gripping the controller 600 and may allow improved access of a thumb(s) to a front-surface control(s). The recessed regions 620, 622 may be oriented in such a manner to allow the thumbs and/or other fingers of the user to conveniently locate and interact with the controls.

As shown, the recessed regions 620, 622 may include respective controls. For example, one or more of the front-surface controls may be disposed within the recessed region 620 of the left handle 628 and within the recessed region 622 of the right handle 630. In some instances, FIG. 6 further illustrates that the one or more front-surface controls may be disposed on sloped portions of the recessed regions 620, 622. As shown in FIG. 6, the left trackpad 608 may be disposed within the recessed region 620, on an angled portion of the recessed region 620. The left trackpad 608, when the controller 600 is held by the user 200, may be oriented towards the user 200, or at least toward the user's left hand and/or left thumb. As shown, the left trackpad 608, or the surface of the recessed region 620 on which the left trackpad 608 is disposed, may be oriented away from the display 626. In some instances, the left trackpad 608 may be oriented slightly upwards (Z-direction). The recessed region 620 may include contours or multiple surfaces for engaging or accommodating portions of the left thumb. For example, the left thumb (e.g., tip of the thumb) of the user 200 may contact the left trackpad 608 for controlling the left trackpad 608. In some embodiments, the recessed region 620 may include other surfaces that are sloped or angled inwards, towards the left trackpad 608, for accommodating phalanx(es) of the left thumb. This way the recessed region 620 may provide a pocket within which the user may rest the left thumb while interacting with the left trackpad 608. On the left handle 628, the left joystick and/or the one or more left buttons 610 controllable by the left thumb (or other fingers of the left hand) may be disposed outside of the recessed region 620, on a flat, planar portion of the front 604, which may be coplanar with the display 626, or at least parallel to a plane of the display 626.

Similarly, as shown on the right handle 630, the right trackpad 618 may be disposed within the recessed region 622, on an angled portion of the recessed region 622. The right trackpad 618, when the controller 600 is held by the user 200, may be oriented towards the user 200, or at least to a right hand and/or right thumb of the user 200. As shown, the right trackpad 618, or the surface of the recessed region 622 on which the right trackpad 618 is disposed, may be oriented away from the display 626. In some instances, the right trackpad 618 may be oriented slightly upwards (Z-direction). The recessed region 622 may include contours or multiple surfaces for engaging or accommodating portions of the right thumb. For example, the right thumb (e.g., tip of the thumb) of the user 200 may contact the right trackpad 618 for controlling the right trackpad 618. In some embodiments, the recessed region 622 may include other surfaces that are sloped or angled inwards, towards the right trackpad 618, for accommodating phalanx(es) of the right thumb. This way the recessed region 622 may provide a pocket within which the user 200 may rest the right thumb while interacting with the right trackpad 618. On the right handle 630, the right joystick and/or the one or more right buttons controllable by the right thumb (or other fingers of the right hand) may be disposed outside of the recessed region 622, on a flat, planar portion of the front 604, which may be coplanar with the display 626, or at least parallel to a plane of the display 626.

While the above discussion is with regard to including certain buttons, or controls, within the recessed region 620 of the left handle 628 and/or within the recessed region 622 of the right handle 630, respectively, other controls may be disposed within the recessed region 620 and/or the recessed region 622, respectively. For example, the thumbsticks on the front surface 604 may be disposed within the recessed regions 620, 622, or within additional recessed regions that are similar to the recessed regions 620, 622. Furthermore, the trackpads 608, 618 are shown as raised above the surface and conspicuous to the naked eye, but the trackpads 608, 618, in some embodiments, may be inconspicuously embedded in the angled surface of the recessed regions 620, 622 such that they are hidden from view.

Figure 7:
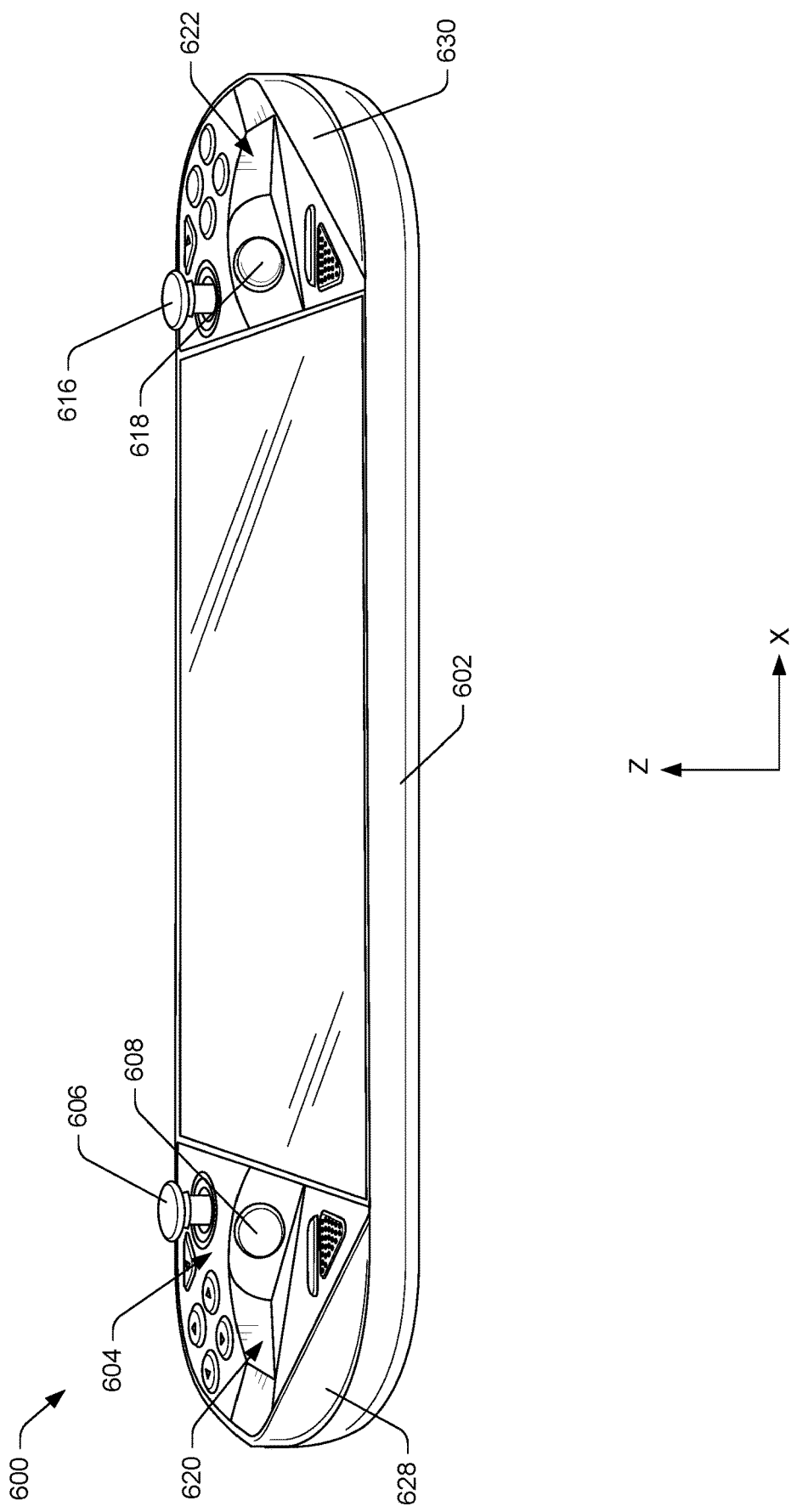
FIG. 7 illustrates an end view of the handheld controller of FIG. 6, that includes, in part, the angled portions of the front surface.

FIG. 7 illustrates an end view of the controller 600, showing the left handle 628 and the right handle 630. As discussed above, the left handle 628 and the right handle 630 may include the recessed regions 620 and 622, respectively, that have surfaces that are sloped or angled relative to the front planar surface 604. For example, as shown, the recessed region 620 may resemble a pocket that is disposed into the controller body 602. The left trackpad 608 may be disposed within the recessed region 620 and on an angled surface that is oriented towards a bottom left-hand corner of the controller body 602. Orienting the left trackpad 608 in this manner may improve ergonomics of the controller 600 and/or increase user comfort when operating the controller 600 (e.g., when operating the left trackpad 608 with the left thumb). Similarly, the recessed region 622 may resemble a pocket that is disposed into the controller body 602. The right trackpad 618 may be disposed within the recessed region 622 and on an angled surface that is oriented towards a bottom right-hand corner of the controller body 602. Orienting the right trackpad 618 in this manner may improve ergonomics of the controller 600 and/or increase user comfort when operating the controller 600 (e.g., when operating the right trackpad 618 with the right thumb).

FIG. 7 further illustrates that at least some controls may be disposed external, or outside, of the recessed regions 620, 622. For example, the left joystick 606 and the one or more left buttons 610 may be located on the left handle 628, but on portions outside of the recessed region 620 that are generally flat, planar portions of the front 604 (e.g., portions that are coplanar with the display 626, or at least parallel to a plane of the display 626). Additionally, or alternatively, the right joystick 616 and the one or more right buttons may be located on the right handle 630, but on portions outside of the recessed region 622 that are generally flat, planar portions of the front 604 (e.g., portions that are coplanar with the display 626, or at least parallel to a plane of the display 626).

Figure 8:
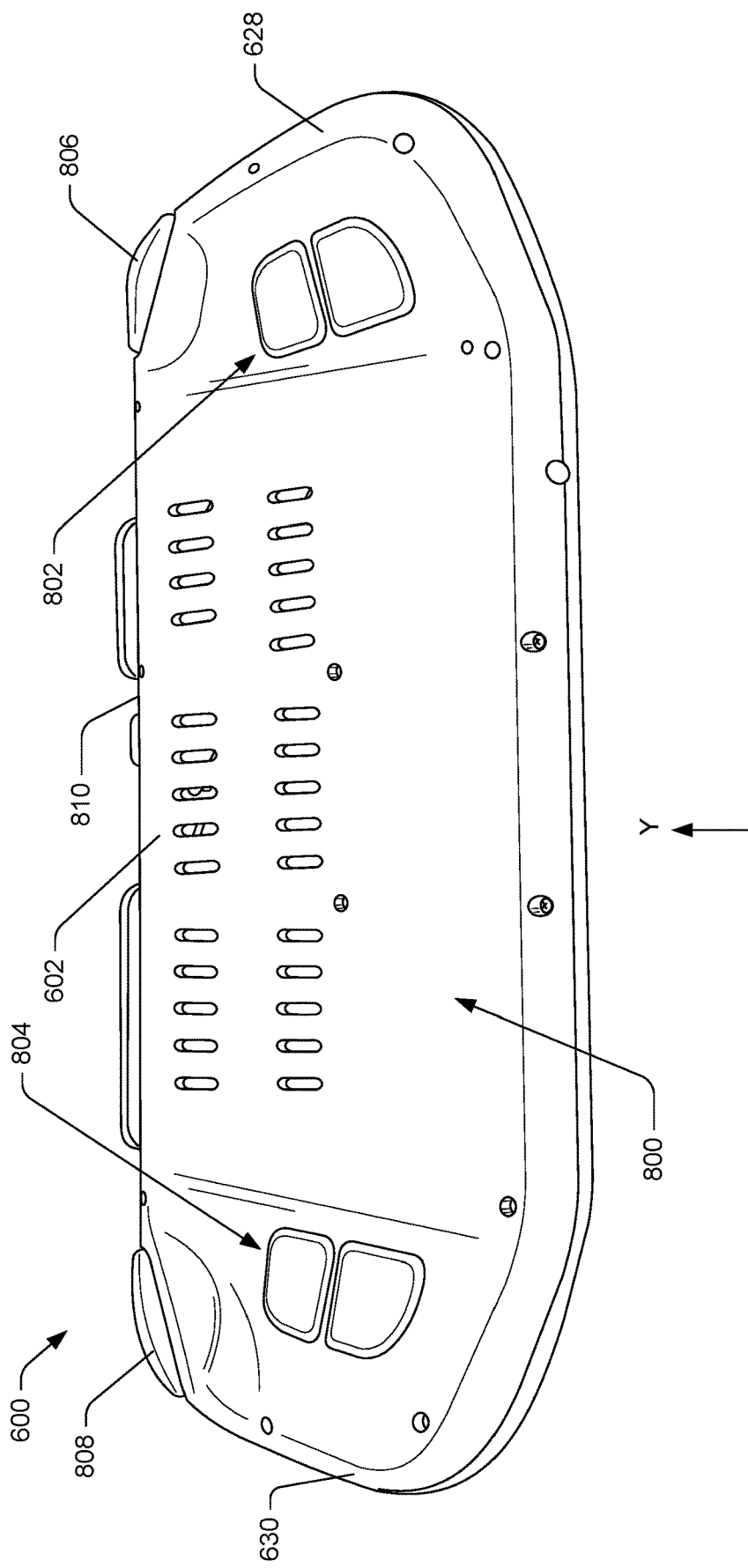
FIG. 8 illustrates a rear view of the handheld controller of FIG. 6 that includes, in part, one or more rear-surface controls.

FIG. 8 illustrates a back view of the controller 600, showing a back 800 of the controller body 602. The back 800 of the controller body 602 at the left handle 628 and the right handle 630 is shown as being angled relative to the central portion (e.g., the front planar surface) of the controller body 602. The back 800 of the controller body 602 may include one or more left controls 802 and/or one or more right controls 804, which may be conveniently manipulated by the index or middle fingers of the user 200 during normal operation while the controller 600 is held in the hands of the user 200. The one or more left controls 802 and/or one or more right controls 804 may be touch-sensitive to identify the presence, position, and/or gestures of one or more fingers on the control(s).

In some instances, the one or more left controls 802 and/or one or more right controls 804 may be located on the left handle 628 and the right handle 630, respectively. In such cases, the one or more left controls 802 and/or one or more right controls 804 may be angled relative to the central portion of the controller body 602.

FIG. 8 further illustrates that one or more left trigger(s) 806 and/or one or more right trigger(s) 808 may be disposed along a top 810 of the controller 600. The one or more left trigger(s) 806 and/or one or more right triggers 808 may be controlled by index fingers of the user 200 during normal operation while the controller 600 is held by the user 200. The top 810 may additionally, or alternatively, include depressible buttons (or other additional input controls) that may be controllable by fingers of the user. In some instances, the top 810 may include a touch sensor for detecting the presence, position, and/or gesture of the finger(s) on the control(s). Additionally, the top 810 may include receiver(s), such as a wired communication interface (e.g., a port, plug, jack, etc.), for communicatively coupling the controller 600 to external devices (e.g., charger, game console, display, computing device, etc.).

Figure 9:
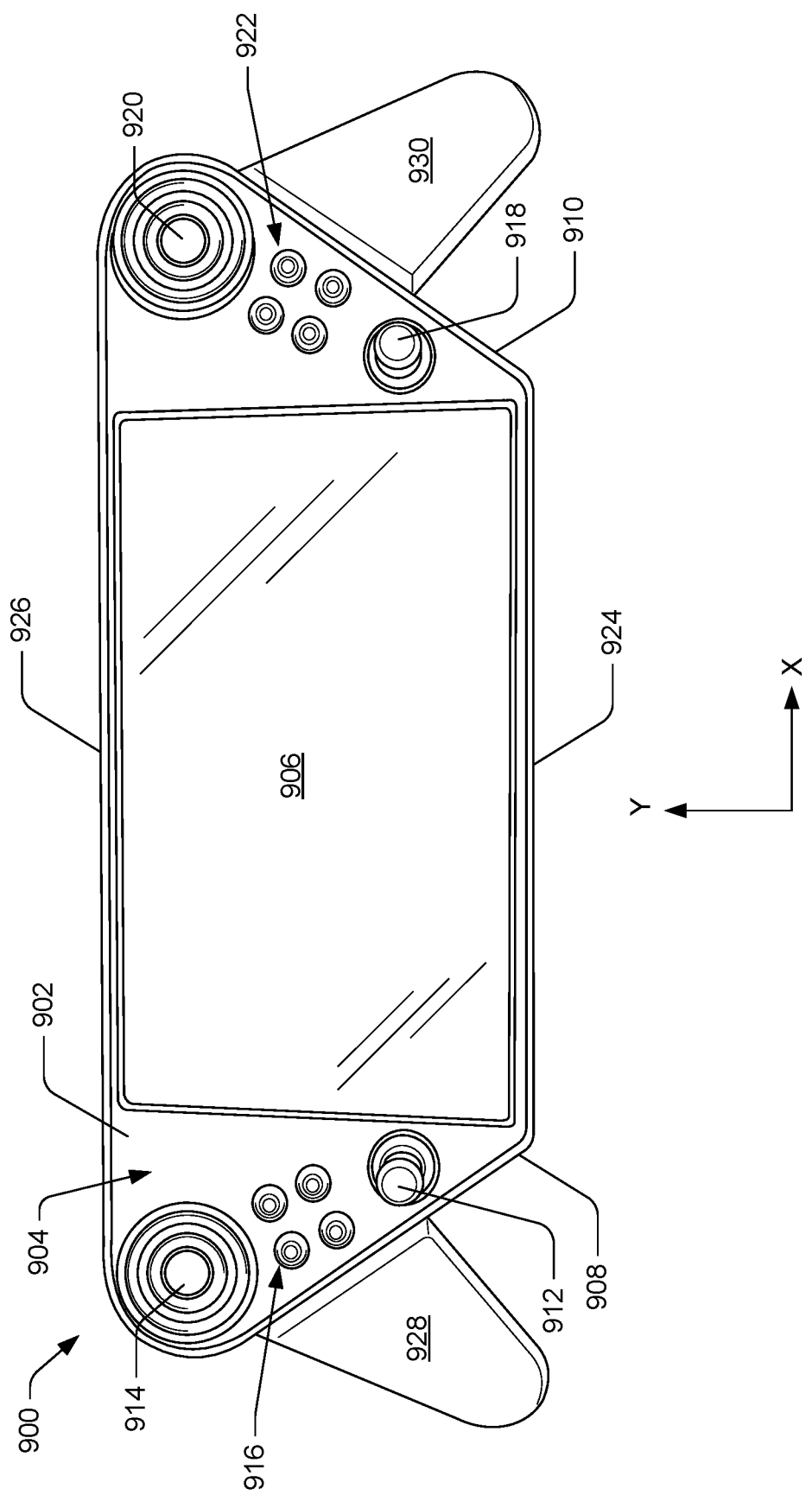
FIG. 9 illustrates a front perspective view of an example handheld controller. Opposing sides of the handheld controller, or a body of the handheld controller, may include handles that are slidable along at least a portion of a length of the sides for improving ergonomics and/or providing access to the one or more front-surface controls and/or one or more back-surface controls.

In some instances, handles or portions of the handheld controller gripped by the user 200 may be configured to slide, readjust, and/or pivot for increased ergonomics. FIG. 9 illustrates a front view of a controller 900, according to an embodiment of the present disclosure. The controller 900 may be considered to be hand-held if it is operated by the hands of a user 200, whether or not the entire controller 900 is supported by or within the hands of the user.

The controller 900 may include a controller body 902 having a front 904 and a back (shown in FIG. 11). In some instances, the controller 900 may include similar components and/or functionality as the controller 100. For example, the front 904 of the controller body 902 may include a plurality of controls configured to receive input of the user 200. Touch data generated by the controls may be used to detect a presence, location, and/or gesture of a finger of a user 200 operating the controller 900. For example, touch data generated by the controls may indicate a location of the touch input, potentially as it changes over time. A controller system including the controller 900 may include logic (e.g., software, hardware, firmware, etc.) that is configured to receive the touch data and determine the presence of a finger of the user and/or a location (or "position") of the finger. For example, the touch sensor may be associated with different regions, such that the logic is configured to determine which region the finger is located in based in part on the touch input. This information may be provided to a game or other application for performing one or more actions corresponding to the location of the finger on the control. For instance, the touch sensor may be associated with two more regions, selection of which is associated with different respective actions. The logic may further analyze the touch data to identify a gesture of the finger on the control, such as the user 200 moving the finger a certain direction, at a certain speed, and/or the like. Again, the logic may provide an indication of this gesture to an application that is configured to perform a predefined action associated with the gesture. In the example of the gaming environment, the game application may switch weapons of a user, cause an avatar to strafe or otherwise move a predefined direction, or perform any other predefined action.

The front 904 may include one or more front-surface controls that are, in some instances, controllable by one or thumbs of the user 200 operating the controller 900. Examples of these front-surface controls may include one or more trackpads, trackballs, joysticks, D-pads, buttons, or the like, as described in more detail below. The front 904 may also include a display 906 located in a center of the controller 900 (or of the controller body 902). The display 906 may be located, or interposed, between a left side 908 and a right side 910 of the controller body 902. In some instances, the display 906 may be centrally located on the controller 900, or within the controller body 902, between the left side 908 and the right side 910.

Disposed on either side of the display 906 may be the one or more front-surface controls. For example, on the left side 908, the controller 900 may include a left joystick 912, a left trackpad 914, and/or one or more left buttons 916 controllable by a left thumb of the user 200. On the right side 910, the controller 900 may include a right joystick 918, a right trackpad 920, and/or one or more right buttons 922 controllable by a right thumb of the user 200. However, the front 904 may include other controls, such as directional pads (D-pads), tilting button(s), trigger(s), knob(s), wheel(s), and/or trackball(s) and the plurality of controls may be configured to receive input from any combination of thumbs and/or fingers of the user 200.

In some instances, the left side 908 and the right side 910 of the controller body 902 or edges thereof may be oriented at angles other than a 90 degree angle relative to a bottom 924, or bottom edge, of the controller 900. For example, as shown in FIG. 9, the left side 908 and the right side 910 may extend at angles other than a 90 degree angle from the bottom 924 of the controller body 902 towards a top 926 of the controller 900. The bottom 924 and the top 926 of the controller 900 may, in some instances, be parallel and substantially horizontal when the controller 900 is in the upright orientation shown in FIG. 9. Given the angled nature of the left side 908 and the right side 910, the bottom 924 of the controller 900 may be shorter than the top 926 of the controller 900. As such, from the bottom 924 of the controller 900, the left side 908 and the right side 910 may extend outward towards the top 926 of the controller 900. In some instances, the left side 908 may be angled away from the bottom 924 by an angle between about 30 degrees and about 40 degrees. Additionally, or alternatively, the right side 910 may be angled away from the bottom 924 by an angle between about 30 degrees to about 40 degrees.

The controller 900 may include a left handle 928 located and/or coupled on the left side 908 of the controller 900 and a right handle 930 located and/or coupled on the right side 910 of the controller 900. The left handle 928 may represent a left wing or left grip that is secured, or held, by the left hand of the user, while the right handle 930 may represent a right wing or right grip that is secured, or held, by the right hand of the user. In some instances, the left handle 928 and the right handle 930, when gripped or held by the user 200, may orient the hands of the user 200 relative to the controller 900 and/or the controls of the controller 900 (e.g., the front surface controls) to allow the user 200 to reach and manipulate certain controls. In this sense, the left handle 928 and the right handle 930 may position or orient the hands, the thumbs, and the fingers of the user 200 relative to the controller 900 and the controls.

The left handle 928 may couple to the controller body 902 along the left side 908. The user 200 may grip the left handle 928 and operate certain controls disposed at, along, or on the left side 908 of the controller 900. Similarly, the right handle 930 may couple to the right side 910 of the controller 900 along the right side 910. The user 200 may grip the right handle 930 and operate certain controls disposed at, along, or on the right side 910 of the controller 900. In some instances, the left handle 928 and/or the right handle 930 may move along the left side 908 and the right side 910, respectively, or orient or position the left handle 928 and the right handle 930 at different locations relative to the controller body 902. In this sense, the left handle 928 may slide along the left side 908 to move the left handle 928 along the left side 908 and reposition the left handle 928 on the controller 900 (or the controller body 902). Similarly, the right handle 930 may slide along the right side 910 to move the right handle 930 along the right side 910 and reposition the right handle 930 on the controller 900 (or the controller body 902). In some instances, the left handle 928 and/or the right handle 930 may be configured to slide in the same plane as the controller body 902. For example, the left handle 928 and/or the right handle 930 may remain in a same plane, or may slide coplanar, in relation to the controller body 902.

In some instances, the user 200 may slide the left handle 928 and/or the right handle 930 based on a current application (e.g., game title) that the user 200 is playing, based on comfort of the user, and/or for any other reason. For example, repositioning the left handle 928 and/or the right handle 930 may allow the user 200 to access certain controls of the controller 900. That is, as discussed above, the left side 908 may include the left joystick 912, the left trackpad 914, and/or the one or more left buttons 916. As shown, the left joystick 912 may be located proximate to the bottom 924 and the left trackpad 914 may be located proximate to the top 426. The one or more left buttons 416 may be located between the left joystick 912 and the left trackpad 914. In some instances, depending on the game or application, the user 200 may desire a certain grip or accessibility to particular controls of the controller 900.

To accommodate for a range of uses, the user 200 may slide the left handle 928 to access the left joystick 912, the left trackpad 914, and/or the one or more left buttons 916. For example, the user 200 may slide or position the left handle 928 near the bottom 924 to utilize the left joystick 912 for a particular game or application. However, in this location, the user 200 may have difficulty reaching the left trackpad 914. Nevertheless, the user 200 may not need to access the left trackpad 914 depending on the particular game or application. By way of another example, the user 200 may position the left handle 928 at or near the top 926 to access or utilize the left trackpad 914. Still, the user 200 may locate the left handle 928 near or at a middle of the left side 908 to utilize all the controls of the left side 908 (e.g., the left joystick 912, the left trackpad 914, and/or the one or more left buttons 916). The user 200 may therefore position the left handle 928 along the left side 908 depending on his or her preferences, the game or application, or for comfort.

The right handle 930 may similarly be repositioned to accommodate different grips, preferences, or accessibility by the user 200. For example, the user 200 may slide the right handle 930 to selectively access the right joystick 918, the right trackpad 920, and/or the one or more right buttons 922. The right handle 930 may be positioned near the bottom 924 to utilize the right joystick 918 or the user 200 may position the right handle 930 at or near the top 926 to access or utilize the right trackpad 920. Accordingly, the user 200 may selectively position the right handle 930 along the right side 910 depending on his or her preferences, the game or application, or for comfort.

In some instances, the left handle 928 and the right handle 930 may be located at different positions along the left side 908 and the right side 910, respectively. For example, the left handle 928 may be located more proximate to the bottom 924 to allow the user 200 to conveniently reach the left joystick 912 while the right handle 930 may be located more proximate to the top 926 to allow the user 200 to conveniently reach the right trackpad 920. However, the left handle 928 and the right handle 930 may be located at similar and/or different positions along the left side 908 and the right side 910, respectively. The sliding nature of the left handle 928 and/or the right handle 930 may therefore allow the user 200 to select or utilize certain controls over others or the user 200 may prefer switching between using one set of controls and another set of controls, or to change a gameplay experience.

In some instances, the left controls may be arranged along the left side 908 and the right controls may be arranged along the right side 910. Additionally, or alternatively, the left controls may be aligned with one another, along a line, that parallels the left side 908, or an edge of the left side 908. In doing so, a trajectory of the left controls may extend outward from the top 926 and the bottom 924 of the controller body 902 to allow the user 200 to reach the controls as the user 200 slides the left handle 928 along the left side 908. Similarly, in some instances, the right controls may be aligned with one another, along a line, that parallels the right side 910, or an edge of the right side 910. In doing so, a trajectory of the right controls may extend outward between the top 926 and the bottom 924 of the controller body 902 to allow the user to reach the controls as the user slides the right handle 930 along the right side 910

FIG. 10 illustrates a front view of the controller body 902, showing the left handle 928 and the right handle 930 removed. As discussed above and in some instances, the left side 908 may be angled away from the bottom 924 by an angle between about 30 degrees to about 40 degrees. Additionally, or alternatively, in some instances, the right side 910 may be angled away from the bottom 924 by an angle between about 30 degrees to about 40 degrees.

In some embodiments, the housing of the handheld controller 900 may include slots or receptacles that are configured to receive protrusions or attachment mechanisms of the handles 928, 930, and within which the handles are configured to slide. The user may couple the handles to the housing of the handheld controller by engaging the protrusions within the slots, and reposition the handles thereafter. Repositioning the handles along the sides may allow the user's fingers (e.g., thumbs) to reach certain controls depending on the game or application being controlled by the handheld controller and/or may provide a better grip of the handheld controller FIG. 11 illustrates a rear view of the controller body 902, showing the controller body 902 with the left handle 928 and the right handle 930 removed therefrom. The controller body 902 may include a substantially flat and planar back 1100. The back 1100 may include features for receiving the left handle 928 and the right handle 930, and which permit the left handle 928 and the right handle 930 to slide along the left side 908 and the right side 910, respectively, for repositioning the left handle 928 and the right handle 930.

For example, the left side 908 may include a left cutout, indent, or notch 1102 for receiving at least a portion of the left handle 928. As shown, the left notch 1102 may extend inward from the left side 908 and along at least a portion of a length of the left side 908. In some instances, a depth of the left notch 1102 may be such that when the left handle 928 couples to the controller body 902, the back 1100 of the controller body 1102 is substantially planar with a back of the left handle 928. The left notch 1102 may include sidewalls or shapes for receiving corresponding shapes of the left handle 928 when coupled together.

The left notch 1102 may include a left slot, receptacle, groove, or channel 1104 for receiving or coupling the left handle 928 to the controller body 902. As shown, the left channel 1104 may extend along at least a portion of the length of the left side 908 or along at least a portion of the length of the left notch 1102. In some instances, the left channel 1104 may extend a smaller distance than a length of the left notch 1102. In some instances, the left channel 1104 may be substantially parallel with the left side 908, or an edge of the left side 908. As discussed herein, the left channel 1104 may receive a corresponding protrusion of the left handle 928. In such instances, the engagement between the protrusion of the left handle 928 and the left channel 1104 permits the left handle 928 to slide along the left side 908. That is, the protrusion of the left handle 928 may slide within the left channel 1104 to position the left handle 928 at different positions along the left side 908. The engagement between the protrusion and the left channel 1104 may ensure that the left handle 928 smoothly slides along the left side 908 and aligns the left handle 928 relative to controls of the controller 900.

The engagement of the protrusion of the left handle 928 within the left channel 1104 may couple and secure the left handle 928 to the body 902. In some instances, this engagement may come by way of snap-fit, pressure fit, slots and grooves, magnets, etc. More generally, the left handle 928 may engage with the controller body 902 using other combinations of male and female connectors, and which permit the left handle 928 to slide along at least a portion of the length of the left side 908. For example, the left handle 928 may include a first attachment mechanism that engages with or within a second attachment mechanism proximate to the left side 908.

The right side 910 may include a right cutout, indent, or notch 1106 for receiving at least a portion of the right handle 930. As shown, and similar to the left notch 1102, the right notch 1106 may extend in a direction inward from the right side 910 and extend along at least a portion of a length of the right side 910. In some instances, a depth of the right notch 1106 may be such that when the right handle 930 couples to the controller body 902, the back 1100 of the controller body 902 is substantially planar with a back of the right handle 930.

The right notch 1106 may include a right slot, receptacle, groove, or channel 1108 for receiving or coupling the right handle 930 to the controller body 902. As shown, the right channel 908 may extend along at least a portion of the length of the right side 910 or along at least a portion of the length of the right notch 1106. In some instances, the right channel 1108 may be substantially parallel with the right side 910, or an edge of the right side 910. As discussed herein, the right channel 1108 may receive a corresponding protrusion of the right handle 930. In such instances, the engagement between the protrusion of the right handle 930 and the right channel 1108 permits the right handle 930 to slide along the right side 910. The protrusion of the right handle 930 may slide within the right channel 1108 to position the right handle 930 at different positions along the right side 910.

The engagement between the protrusion of the right handle 930 within the right channel 1108 may couple and secure the right handle 930 to the controller body 902. In some instances, this engagement may come by way of snap-fit, pressure fit, slots and grooves, magnets, etc. More generally, the right handle 930 may engage with the controller body 902 using other combinations of male and female connectors, and which permit the right handle 930 to slide along at least a portion of the length of the right side 910. For example, the right handle 930 may include a first attachment mechanism that engages with or within a second attachment mechanism proximate to the right side 910.

Figure 12:
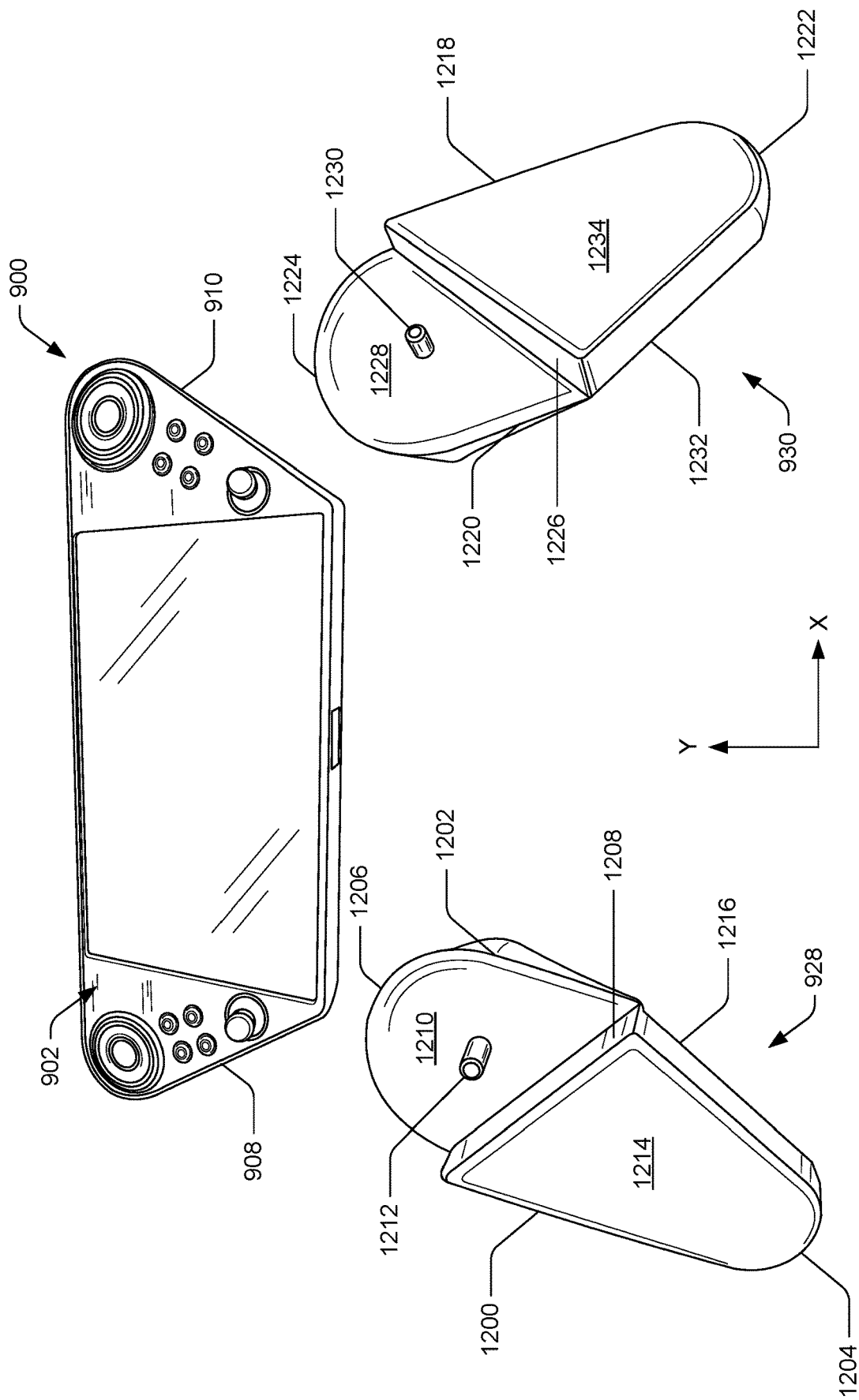
FIG. 12 illustrates the handheld controller of FIG. 9, showing projections of the handles that engage with the slots on the back of the body for coupling the handles to the body of the handheld controller.

FIG. 12 illustrates a front view of the controller body 902, showing the left handle 928 and the right handle 930 removed from the controller body 902. As discussed above, the left handle 928 may couple to the left side 908 of the controller body 902 and the right handle 930 may couple to the right side 910 of the controller body 902. The left handle 928 may include a first portion 1200 to be gripped by the user, such as the left hand of the user, and a second portion 1202 insertable or configured to reside within the left notch 1102 of the controller body 902. In some instances, the left handle 928 may include a first end 1204 that tapers outwards towards a second end 1206. The first end 1204 may be rounded and when the left handle 928 couples to the controller body 902, may reside external to the left notch 1102 (so as to be gripped by the user). The second end 1206, when the left handle 928 couples to the controller body 902, resides within the left notch 1102 and may abut a sidewall or edge of the left notch 1102.

The left handle 928 also includes a sidewall or an edge 1208 between the first end 1204 and the second end 1206. The edge 1208 may be configured to abut the left side 908 when the left handle 928 couples to the controller body 902. The edge 1208 may include a similar angle or projection as the left side 908 such that when the left handle 928 couples to the controller body 902, the left handle 928 is disposed at an angle relative to the bottom 924 of the controller body 902 (as shown in FIG. 9). The similar angle of the edge 1208 and the left side 908, or by abutting the edge 1208 and the left side 908, may prevent the left handle 928 rotating during use.

The second portion 1202 of the left handle 928 includes a recessed region 1210 having a tab, projection, or protrusion 1212 configured to engage within the left channel 1104 of the controller body 902. This engagement may couple the left handle 928 to the controller body 902 and/or align the left handle 928 relative to the controller body 902. Additionally, the engagement between the protrusion 1212 and the left channel 1104 allows the left handle 928 to slide within the left channel 1104 and along the left side 908 of the controller body 902. The recessed region 1210 may be recessed by an amount substantially equal to a depth of the left notch 1102. In some instances, when the left handle 928 couples to the controller body 902, a top 1214 of the left handle 928 may be substantially planar with the front 904 of the controller body 902. Additionally, or alternatively, when the left handle 928 couples to the controller body 902, a bottom 1216 of the left handle 928 may be substantially planar with the back 1100 of the controller body 902. As shown in FIG. 12, the protrusion 1212 may extend in a direction toward the top 1214 of the left handle 928.

The right handle 930 may include similar components or features as the left handle 928. For example, the right handle 930 may include a first portion 1218 to be gripped by the user, such as the right hand of the user, and a second portion 1220 insertable or configured to reside within the right notch 1106 of the controller body 902. In some instances, the right handle 930 may include a first end 1222 that tapers outwards towards a second end 1224. The first end 1222 may be rounded and when the right handle 930 couples to the controller body 902, may reside external to the right notch 1106. The second end 1224, when the right handle 930 couples to the controller body 902, resides within the right notch 1106 and may abut a sidewall or edge of the right notch 1106.

The right handle 930 also includes an edge 1226 between the first end 1222 and the second end 1224. The edge 1226 may be configured to abut the right side 910 when the right handle 930 couples to the controller body 902. The edge 1226 may include a similar angle as the right side 910 such that when the right handle 930 couples to the controller body 902, the right handle 930 is disposed at an angle relative to the bottom 924 of the controller body 902 (as shown in FIG. 9). The similar angle of the edge 1226 and the right side 910, or by abutting the edge 1226 and the right side 910, may prevent the right handle 930 rotating during use.

The second portion 1220 of the right handle 930 includes a recessed region 1228 having a tab, projection, or protrusion 1230 configured to engage within the right channel 1108 of the controller body 902 to couple the right handle 930 to the controller body 902. This engagement may couple the right handle 930 to the controller body 902 and/or align the right handle 930 relative to the controller body 902. Additionally, the engagement between the protrusion 1230 and the right channel 1108 allows the right handle 930 to slide within the right channel 1108 and along the right side 910 of the controller body 902. The recessed region 1228 may be recessed by an amount substantially equal to a depth of the right notch 1106. In some instances, when the right handle 930 couples to the controller body 902, a top 1234 of the right handle 930 may be substantially planar with the front 904 of the controller body 902. Additionally, or alternatively, when the right handle 930 couples to the controller body 902, a bottom 1232 of the right handle 930 may be substantially planar with the back 1100 of the controller body 902. As shown in FIG. 12, the protrusion 1230 may extend in a direction toward the top 1234 of the right handle 930.

Although the left handle 928 and the right handle 930 are illustrated and described as coupling to the controller body 902 in a particular manner, other embodiments are envisioned. For example, the left handle 928 and/or the right handle 930 may include a groove that engages with respective flanges, protrusions, or pins on the controller body 902 (within the left notch 1102 and the right notch 1106, respectively). The grooves of the left handle 928 and the right handle 930, respectively, may enclose the pins to permit the left handle 928 and the right handle 930 to slide. Additionally, or alternatively, the pins of the controller body 902 may include flanges that engage with a lip within the groove. The engagement between the flanges within the lip may provide further engagement between the left handle 928 and the right handle 930.

In some instances, the engagement between the left handle 928 and the right handle 930 with the controller body 902 may securely couple the left handle 928 and the right handle 930 to the controller body 902, while still allowing the left handle 928 and the right handle 930 to slide along the left side 908 and the right side 910, respectively. In some instances, the left handle 928 and the right handle 930 may slide along the left side 908 and the right side 910, respectively, by applying an amount of force that overcomes the coupling force between the left handle 928 and the right handle 930 with the controller body 902.

In some instances, the left handle 928 and the right handle 930 may be removably coupled to the controller body 902. In such cases, the left handle 928 and the right handle 930 may be removed from the controller body 902 and reintroduced onto the controller body 902 at a different location along the left side 908 and the right side 910, respectively. Regardless of the specific coupling between the left handle 928 and the right handle 930 to the controller body 902, the left handle 928 and the right handle 930 may be securely coupled to the controller body 902.

In some instances, the handheld controller 900 may detect or sense a position of the handles 928, 930 relative to the controller body 902 and automatically enable or disable certain controls. For example, when the handles 928, 930 are in a certain position, the user 200 may be unable to reach certain controls on the front and/or the back of the handheld controller 900. In such instances, the handheld controller 900 may enable certain controls that are likely accessible (e.g., reachable) and/or disable certain controls that are likely not accessible (e.g., unreachable). That is, depending on the position of the handles 928, 930, certain controls may be enabled and/or disabled, respectively.

Additionally, or alternatively, the handles may be rotatably coupled to the housing of the handheld controller. For example, handles may be pivotably coupled to the housing to extend the handles away from the housing or collapse the handles towards the housing of the handheld controller. When the handles are extended away from the housing, the user may grip onto the first handle and the second handle to secure the handheld controller in the hands of the user. When the handles are collapsed towards the housing (or into the housing), the user may grip the first handle, the second handle, and portions of the housing for securing the handheld controller within the hands of the user. The user may therefore choose to swing the handles away from the housing of the handheld controller or towards the housing of the handheld controller depending on the game or application being controlled by the handheld controller, and/or depending on the user's preference. In some instances, the position of the handles may improve user comfort when holding the handheld controller and/or may provide improved access to one or more controls of the handheld controller.

Figure 13:
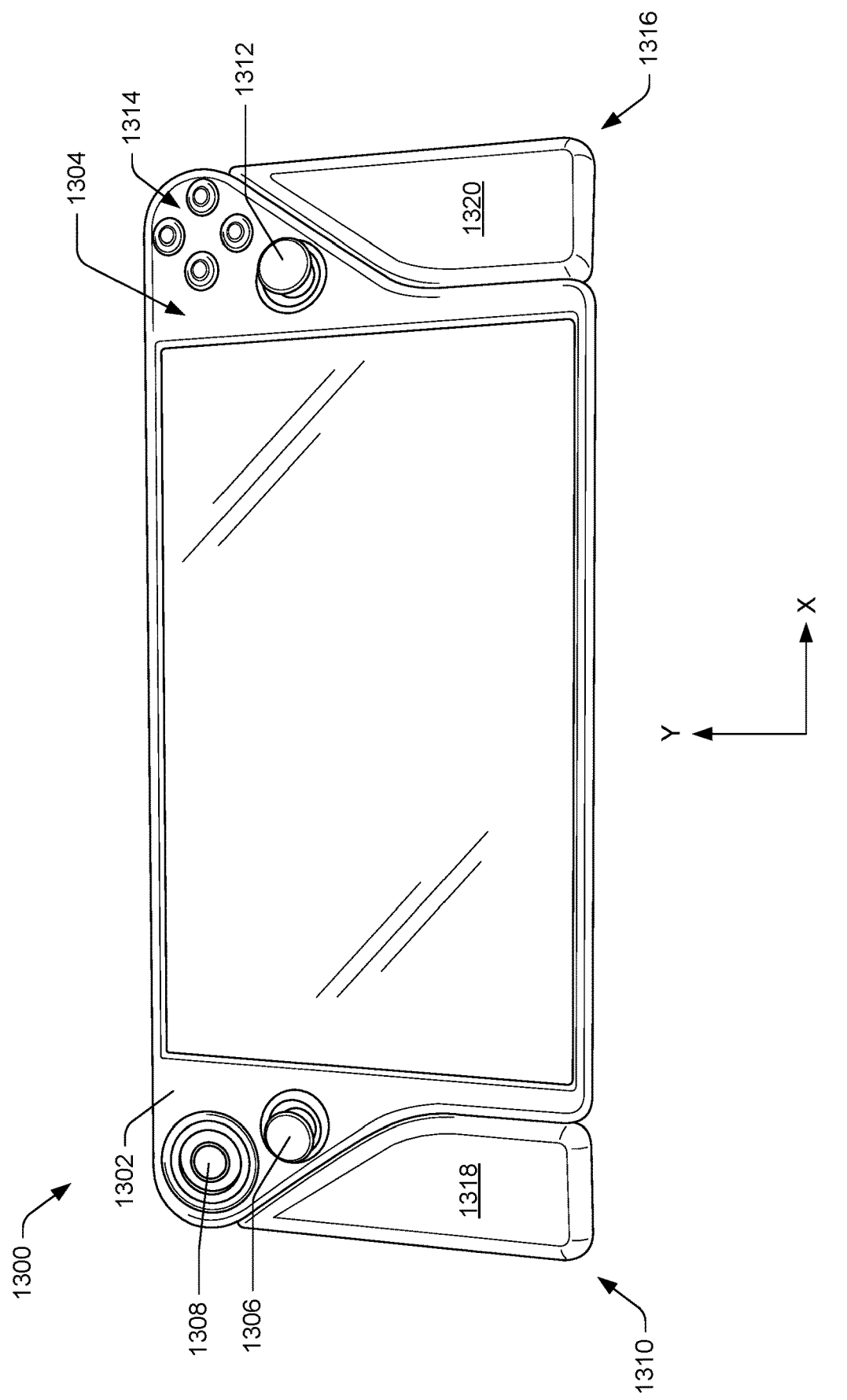
FIG. 13 illustrates a front view of an example handheld controller. Opposing sides of the handheld controller may include handles that are pivotably coupled to a body of the handheld controller for improving ergonomics and/or providing access to one or more front-surface controls and/or one or more back-surface controls.

FIG. 13 illustrates a front view of an example controller 1300, according to an embodiment of the present disclosure. The controller 1300 may be considered to be hand-held if it is operated by the hands of a user, whether or not the entire controller 1300 is supported by or within the hands of the user.

Figure 15:
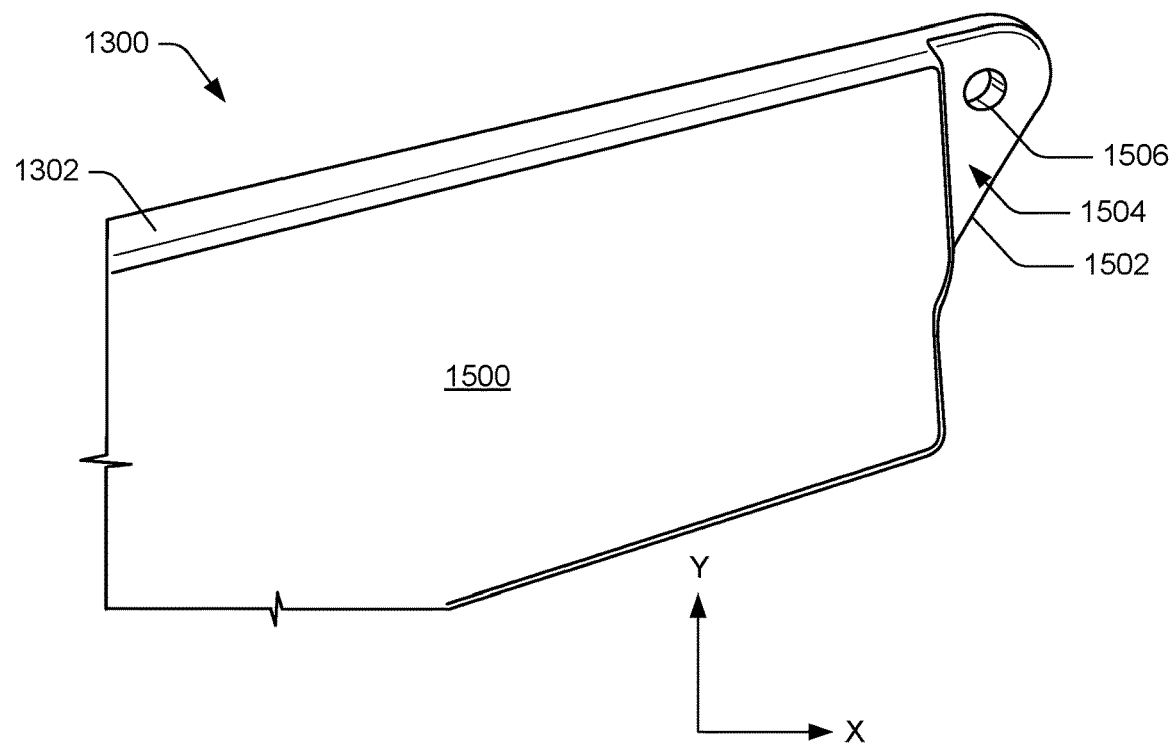
FIG. 15 illustrates a rear view of the handheld controller of FIG. 13 that includes, in part, a receiver disposed in the body of the handheld controller for receiving the handles and coupling the handles to the body.

The controller 1300 may include a controller body 1302 having a front 1304 and a back (shown in FIG. 15). As illustrated, the front 1304 of the controller body 1302 may include a plurality of controls configured to receive input of the user. Touch data generated by the controls may be used to detect a presence, location, and/or gesture of a finger of a user operating the controller 1300. In some instances, the front 1304 may include one or more front-surface controls that are, in some instances, controllable by one or thumbs of the user operating the controller 1300. These front-surface controls may include one or more trackpads, trackballs, joysticks, buttons, or the like, as described in more detail below. For example, the front 1304 may include a left joystick 1306 and a left trackpad 1308 disposed on a left side 1310, on the front 1304, of the controller body 1302. The left joystick 1306 and the left trackpad 1308 may be controllable by a left thumb of the user.

The front 1304 may also include a right joystick 1312 and/or one or more right buttons 1314 disposed on a right side 1316, on the front 1304, of the controller body 1302. The right joystick 1312 and the one or more right buttons 1314 may be controllable by a right thumb of the user. However, the front 1304 may include other controls, such as directional pads (D-pads), tilting button(s), trigger(s), knob(s), wheel(s), and/or trackball(s) and the plurality of controls may be configured to receive input from any combination of thumbs and/or fingers of the user. Additionally, the controller 1300 may include a display disposed in a middle of the controller body 1302, between the left side 1310 and the right side 1316.

In some instances, the controller 1300 may include a left handle 1318 and a right handle 1320. The left handle 1318 may couple to the controller body 1302 at a location on or along the left side 1310 of the controller body 1302. The right handle 1320 may couple to the controller body 1302 at a location on or along the right side 1316 of the controller body 1302. As discussed herein, the left handle 1318 and the right handle 1320 may pivotably couple to the controller body 1302 to permit the left handle 1318 and the right handle 1320 to extend away from the controller body 1302 and collapse towards the controller body 1302. For example, as shown in FIG. 13, the left handle 1318 and the right handle 1320 may be fully collapsed into or against the controller 1300. In other words, from the position shown in FIG. 13, the left handle 1318 and the right handle 1320 may be pivotable away from the controller body 1302 but may not be pivoted more towards the controller body 1302. In such instances, the controller 1300 may generally include a rectangular cuboid shape (via the controller body 1302, the left handle 1318, and the right handle 1320.). In the collapsed state, in some instances, the user may grip the controller 1300 via the left handle 1318, the right handle 1320, and/or portions of the controller body 1302.

Figure 14:
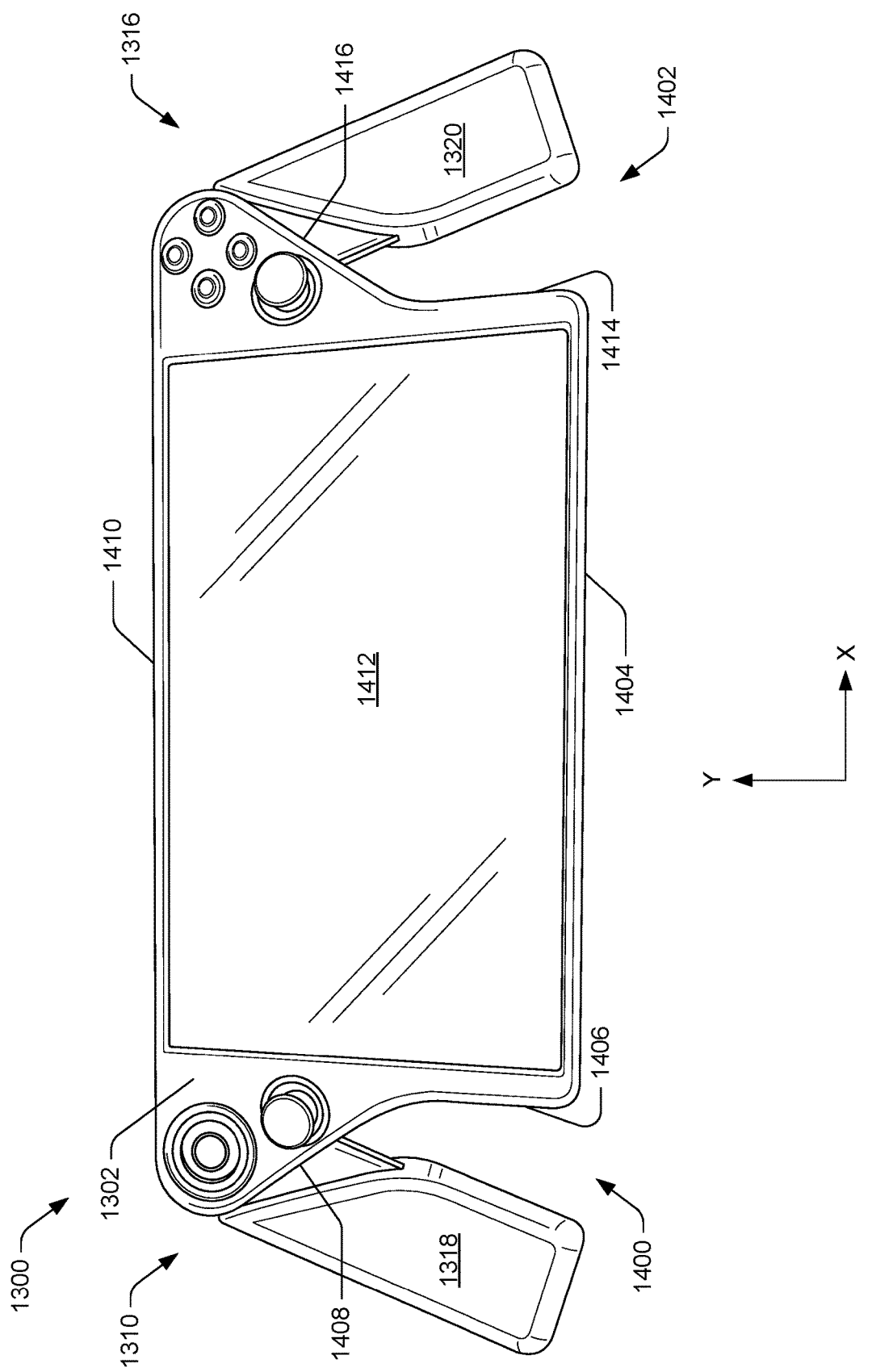
FIG. 14 illustrates a front view of the handheld controller of FIG. 13, showing the handles in a position pivoted away from the body of the handheld controller.

FIG. 14 illustrates the controller 1300, showing the left handle 1318 and the right handle 1320 disposed or extended away from the controller body 1302. In some instances, extending the left handle 1318 and the right handle 1320 away from the controller body 1302 may permit the left hand and the right hand of the user to fully or wrap around the left handle 1318 and the right handle 1320, respectively. In such instances, the left hand and the right hand of the user may still be permitted to operate the respective controls on the left side 1310 and the right side 1316 of the controller 1300. The user may, for example, choose to extend or stow the left handle 1318 and the right handle 1320 at various, different angles depending on personal preferences and/or the game being played.

As shown in FIG. 14, the controller body 1302 may include intendents, cuts, notches, or recesses for receiving the left handle 1318 and the right handle 1320 in the collapsed state. For example, the left side 1310 of the controller body 1302 may include a left recess 1400 and the right side 1316 of the controller body 1302 may include a right recess 1402. The left recess 1400 and the right recess 1402 may be correspondingly shaped to receive the left handle 1318 and the right handle 1320 such that when the left handle 1318 and the right handle 1320 are collapsed into or towards the controller body 1302, the controller 1300 includes a substantially rectangular cuboid shape.

The left recess 1400 and the right recess 1402 may be correspondingly shaped and include contours for receiving complimentary contours of the left handle 1318 and the right handle 1320, respectively. For example, a first portion 1406 of the left recess 1400 may be oriented substantially perpendicular to a bottom 1404 of the controller body 1302, and a second portion 1408 of the left recess 1400 may be oriented or angled away from the bottom 1404, towards a top 1410, of the controller body 1302. In this sense, the second portion 1408 of the left recess 1400 may be oriented away the bottom 1404 and towards the top 1410. Angling the left recess 1400 in this manner, extending away from a display 1412, may provide an area for the left joystick 1306 and the left trackpad 1308.

Similarly, a first portion 1414 of the right recess 1402 may be oriented perpendicularly to the bottom 1404 of the controller body 1302, and a second portion 1416 of the right recess 1402 may be oriented or angled away from the bottom 1404, towards the top 1410 of the controller body 1302. In this sense, the second portion 1416 of the right recess 1402 may be oriented away the bottom 1404 and extend towards the top 1410. Angling the right recess 1402 in this manner, extending away from the display 1412, may provide an area for the right joystick 1312 and the one or more right buttons 1314.

The user may position their left hand and right hand along lengths of the left handle 1318 and the right handle 1320, respectively, to utilize the controls on the front 1304. In some instances, the left handle 1318 and/or the right handle 1320 may be configured to extend away from the controller body 1302 by a limited amount of angles or between a certain range of predetermined angles. For example, the left handle 1318 and/or the right handle 1320 may extend away from the controller body 1302 between 0 and 45 degrees (relative to the bottom 1404, the top 1410, or a longitudinal axis of the controller body 1302.).

FIG. 15 illustrates a rear view of a portion of the controller 1300, showing a back 1500 of the controller 1300 without the left handle 1318 coupled to the controller body 1302. FIG. 15 illustrates the left side 1310 of the controller body 1302. However, the right side 1316 of the controller body 1302 may include similar features.

On the back 1500, the left side 1310 of the controller body 1302 may include a left tab, projection, or flange 1502. A bottom surface 1504 of the left flange 1502 may include a left receiver 1506 (e.g., hole, slot, etc.) for receiving a feature of the left handle 1318. For example, the left receiver 1506 may receive a projection of the left handle 1318 for pivotably coupling the left handle 1318 to the controller body 1302. As shown, the left receiver 1506 may include a circular hole configured to receive the projection of the left handle 1318. The bottom surface 1504 of the left flange 1502 may be inset or recessed from the back 1500 of the controller body 1302. In some instances, the left joystick 1306 and/or the trackpad 1308 may be located on a top surface (opposite the bottom surface 1504) of the left flange 1502.

Although not shown, the right side 1316 of the controller body 1302 may include a right tab, projection, or flange. The right tab may be similar to, and include similar features as the left flange 1502 for pivotably coupling the right handle 1320 to the controller body 1302. For example, the right flange may include a bottom surface having a receiver for receiving a feature of the right handle 1320. By way of example, the right receiver may receive a projection of the right handle 1320 for pivotably coupling the right handle 1320 to the controller body 1302. In some instances, the right receiver may include a circular hole configured to receive a circular projection of the right handle 1320. Additionally, the bottom surface of the right flange may be inset or recessed from the back 1500 of the controller body 1302. In some instances, the right joystick 1312 and/or the one or more right buttons 1314 may be located on a top surface (opposite the bottom surface) of the right flange. In some instances, the left handle 1318 and/or the right handle 1320 may pivot relative to the controller body 1302, but in plane with controller body 1302.

Figure 16:
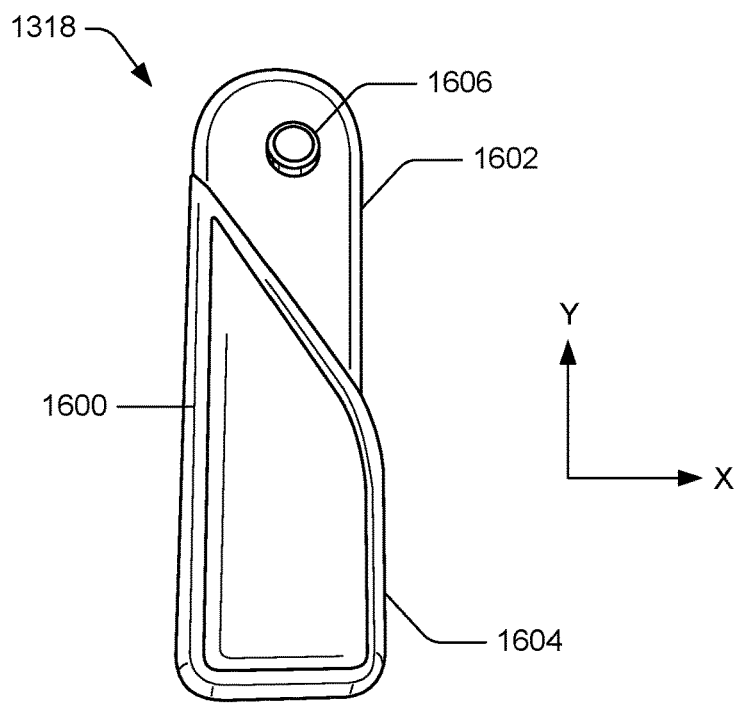
FIG. 16 illustrates a front view of an example handle of the handheld controller of FIG. 13 that includes, in part, a grip for handling by a user of the handheld controller and a protrusion for engaging with the receiver disposed in the body of the handheld controller. The protrusion may engage within the receiver for pivotably coupling the handle to the body of the handheld controller.

FIG. 16 illustrates the left handle 1318 of the controller 1300, removed from the controller body 1302. The left handle 1318 is shown including a body 1600 having a first portion 1602 and a second portion 1604. The first portion 1602 may include components configured to couple to the controller body 1302. As shown, the left handle 1318 may include a projection 1606 configured to engage within the left receiver 1506. The projection is 1606 is shown located on the first portion 1602, which may be recessed from the second portion 1604. When the projection 1606 couples within the receiver 1506, the left handle 1318 may be secured to the controller body 1302 and may be pivotable to permit the left handle 1318 to extend from the controller body 1302 and collapse towards the controller body 1302. Additionally, although FIGS. 15 and 16 illustrate certain features for pivotably coupling the left handle 1318 to the controller body 1302, other connection or attachment mechanisms may be utilized.

A thickness of the left handle 1318 may be substantially equal to a thickness of the controller body 1302. The second portion 1604 of the left handle 1318 may be of sufficient length for allowing the left hand of the user to firmly and securing grip the left handle 1318. As shown, the second portion 1604 of the left handle 1318 may include a shape for residing within the left recess 1400 when the left handle 1318 is collapsed within or towards the controller body 1302.

Additionally, although not shown, the right handle 1320 may include similar features as the left handle 1318 for coupling the right handle 1320 to the controller body 1302. For example, the right handle 1320 main include a body having shapes and contours to collapse within the right recess 1402. To couple the right handle 1320 to the controller body 1302, the right handle 1320 may include a projection configured to engage within the right receiver. When the protrusion of the right handle 1320 couples within the receiver, the right handle 1320 may be secured to the controller body 1302 and may be pivotable to permit the right handle 1320 to extend from the controllable body 1302 and collapse towards the controller body 1302.

Figure 17A:
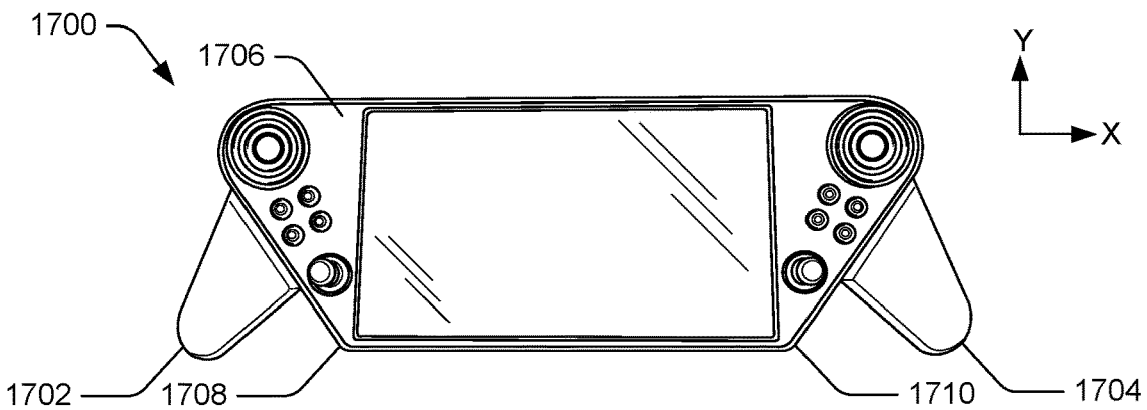
FIG. 17A illustrates a front view of an example handheld controller that includes, in part, one or more front-surface controls that are accessible and/or functional when handles of the handheld controller are in a first position.
Figure 17B:
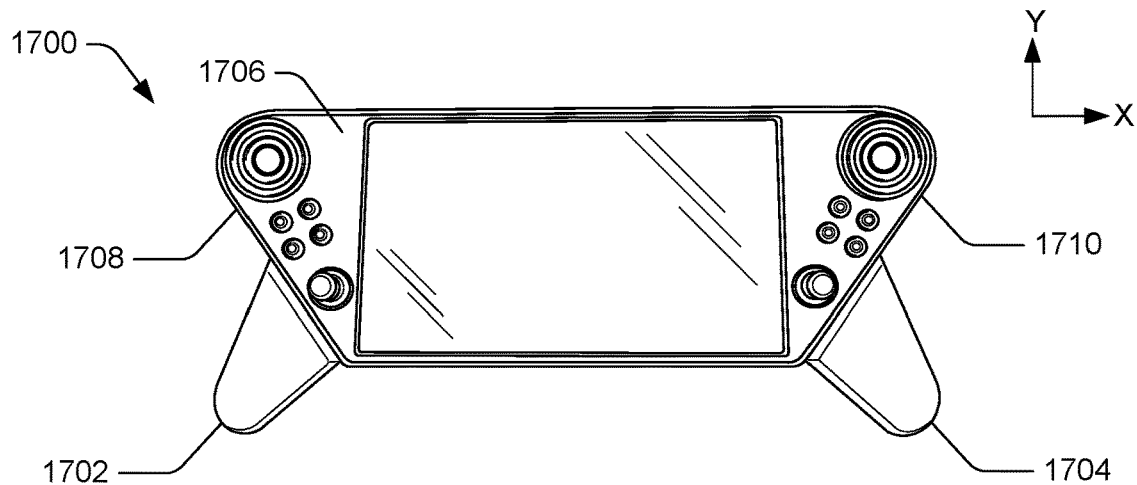
FIG. 17B illustrates a front view of the handheld controller of FIG. 17A that includes, in part, one or more front-surface controls that are accessible and/or functional when handles of the handheld controller are in a second position.
Figure 17C:
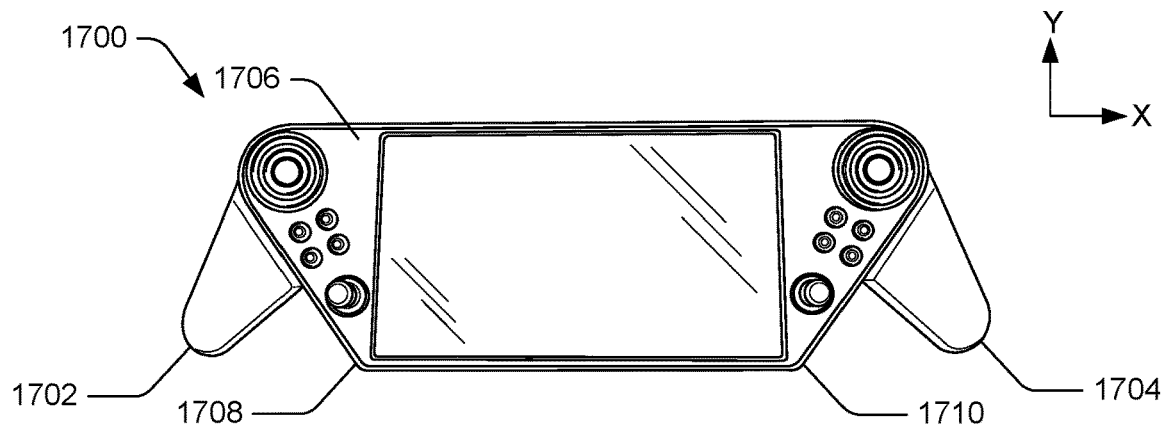
FIG. 17C illustrates a front view of the handheld controller of FIG. 17A that includes, in part, one or more front-surface controls that are accessible and/or functional when handles of the handheld controller are in a third position.

FIGS. 17A-17C illustrate adjusting handles of an example controller 1700 to configure certain controls of the controller 1700. In some instances, the controller 1700 may include similar components, or represent, the controller 900. For example, the controller 1700 may include a left handle 1702 and a right handle 1704 configured to couple to a controller body 1706 of the controller 1700. The left handle 1702 and the right handle 1704 may be slidable along a left side 1708 and a right side 1710 of the controller body 1706.

As shown in FIG. 17A, the left handle 1702 and the right handle 1704 may be disposed at a first position along the left side 1708 and the right side 1710 of the controller body 1706, respectively. For example, the left handle 1702 and the right handle 1704 may be disposed or positioned along a centerline of the controller body 1706, substantially located in the center of the left side 1708 and the right side 1710 respectively. In some instances, locating the left handle 1702 and the right handle 1704 in the first position (as shown in FIG. 17A) may cause certain controls of the controller 1700 to be enabled and/or certain controls of the controller 1700 to be disabled. For example, in the first position, a left trackpad, one or more left buttons, and/or a left joystick may be accessible by the left hand of the user when holding the left handle 1702. Additionally, in the first position, a right trackpad, one or more right buttons, and/or a right joystick may be accessible by the right hand of the user when holding the right handle 1704.

In some instances, the left handle 1702 and/or the right handle 1704 may include elements sensed or detected by components of the controller 1700 for determining the position of the left handle 1702 and the right handle 1704. For example, the left handle 1702 and/or the right handle 1704 may include magnet or conductive elements that are sensed by capacitive sensors of the controller 1700 for determining a position of the left handle 1702 and/or the right handle 1704. Additionally, or alternatively, as discussed above, the controller body 1706 may include a channel within which a projection of the left handle 1702 or the right handle 1704 resides. Sensors of the controller 1700 may detect a position of the projection along a length of the channel for use in determining a position of the handles. However, the controller 1700, the left handle 1702, and/or the right handle 1704 may include components for determining a position of the left handle 1702 and/or the right handle 1704 on the controller body 1706.

FIG. 17B illustrates the left handle 1702 and the right handle 1704 disposed at a second position along the left side 1708 and the right side 1710 of the controller body 1706, respectively. For example, the left handle 1702 and the right handle 1704 may be disposed towards a bottom of the controller body 1706. In some instances, the user of the controller 1700 may reposition the left handle 1702 and/or the right handle 1704 to the second position to permit accessibility to one or more controls. In some instances, locating the left handle 1702 and the right handle 1704 in the second position (as shown in FIG. 17B) may cause certain controls of the controller 1700 to be enabled and/or certain controls of the controller 1700 to be disabled. For example, in the second position, the one or more left buttons and/or the left joystick may be accessible by the left thumb of the user when holding the left handle 1702. However, in this position, the left trackpad may not be easily accessible by the user. Accordingly, in some instances, the controller 1700 may disable the left trackpad when the left handle 1702 is in the second position (as shown in FIG. 17B). In some instances, in the second position, the left trackpad may be disabled unless a threshold amount of force is received and/or inputs detected at the left trackpad may be ignored unless a threshold amount of force is received. Additionally, or alternatively, the controller 1700 (or a computing device communicatively coupled to the controller 1700) may ignore inputs received at the left trackpad. Still, in some instances, the one or more left buttons and/or the left joystick may be considered primary inputs and the left trackpad may be considered accessory, or secondary, inputs. Similarly, in the second position, the right trackpad of may not be easily accessible by the user, while the one or more right buttons and/or the right joystick may be accessible by the right thumb of the user when holding the right handle 1704.

FIG. 17C illustrates the left handle 1702 and the right handle 1704 disposed at a third position along the left side 1708 and the right side 1710 of the controller body 1706, respectively. For example, the left handle 1702 and the right handle 1704 may be disposed towards a top of the controller body 1706. In some instances, the user of the controller 1700 may reposition the left handle 1702 and/or the right handle 1704 in the third position to permit accessibility to one or more controls. In some instances, locating the left handle 1702 and the right handle 1704 in the third position (as shown in FIG. 17C) may cause certain controls of the controller 1700 to be enabled and certain controls of the controller 1700 to be disabled. For example, in the third position, the one or more left buttons and/or the left trackpad may be accessible by the left thumb of the user. However, in the third position, the left joystick of may not be easily accessible by the user and may be disabled. Additionally, or alternatively, the controller 1700 (or a computing device communicatively coupled to the controller 1700) may ignore inputs received at the left joystick when the left handle 1702 is in the third position. Similarly, in the third position, the right joystick of may not be easily accessible by the user, while the one or more right buttons and/or the right trackpad may be accessible by the right thumb of the user.

In some instances, disabling certain controls depending on the position of the handles may reduce a power consumption of the controller 1700 and/or may be used to ignore spurious inputs. Additionally, although FIGS. 17A-17C illustrate certain positions of the left handle 1702 and the right handle 1704 along the left side 1708 and the right side 1710 of the controller 1700, the left handle 1702 and the right handle 1704 may be disposed at other locations for enabling and/or disabling one or more controls. Furthermore, similar techniques may be used to determine the position of the left handle 1318 and the right handle 1320 of the controller 1300. For example, depending on the angle at which the left handle 1318 and/or the right handle 1320 are disposed away from the controller body 1302, certain controls may be enabled and/or disabled.

Figure 18:
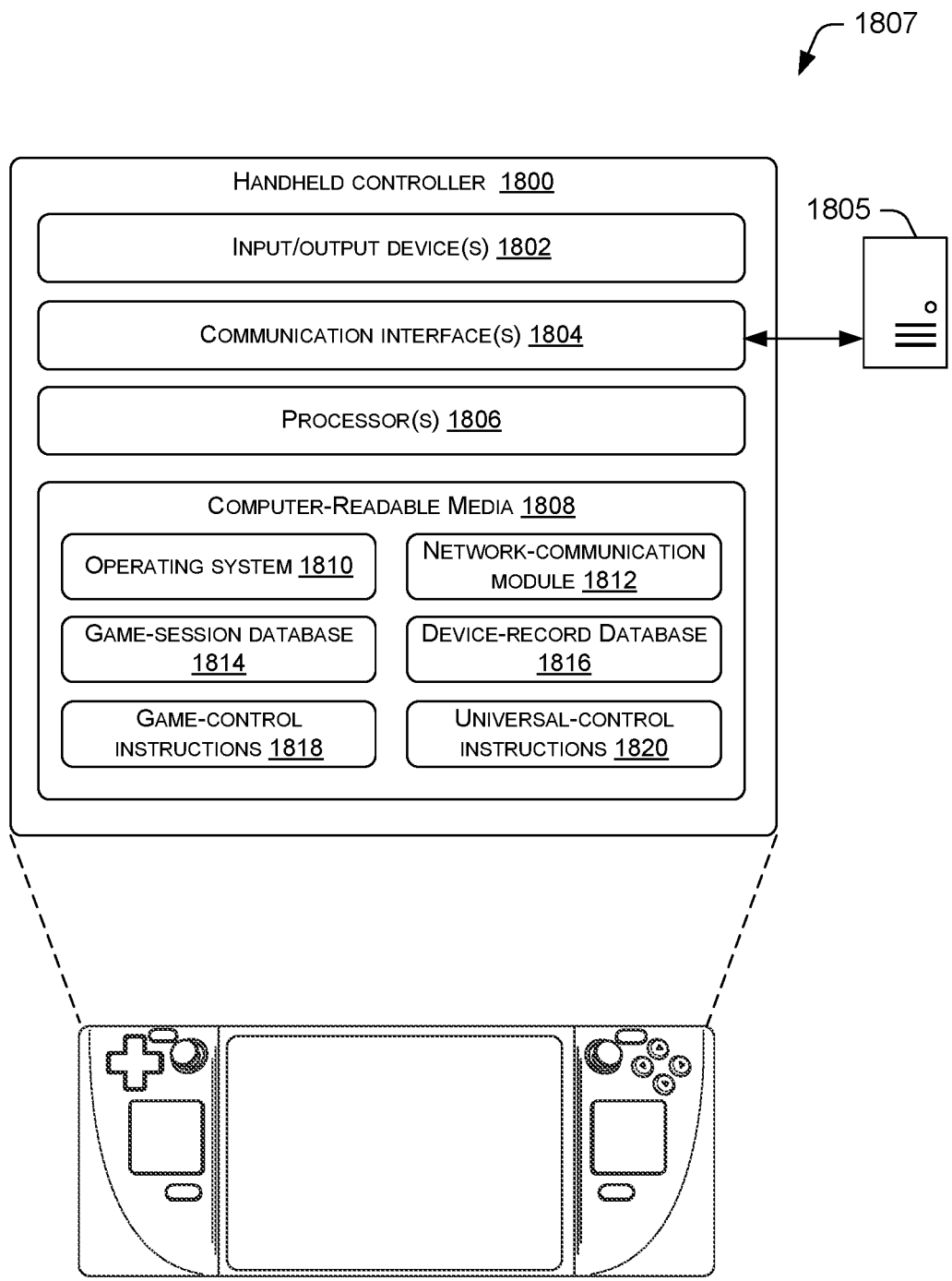
FIG. 18 illustrates example functional components of an example handheld controller.

FIG. 18 illustrates example computing components of a controller 1800, such as the controller 100, the controller 600, the controller 900, the controller 1300, and/or the controller 1700. As illustrated, the handheld controller 1800 includes one or more input/output (I/O) devices 1802, such as the controls described above (e.g., joysticks, trackpads, triggers, etc.), potentially any other type of input or output devices. For example, the I/O devices 1902 may include one or more microphones to receive audio input, such as user voice input. In some implementations, one or more cameras or other types of sensors (e.g., inertial measurement unit (IMU)) may function as input devices to receive gestural input, such as motion of the controller 1800. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the handheld controller may additionally or alternatively comprise any other type of output device.

In some instances, output by the one or more output devices may be based on input received by one or more of the input devices. For example, selection of a control may result in the output of a haptic response by a vibrator located adjacent (e.g., underneath) the control or at any other location. In some instances, the output may vary based at least in part on a characteristic of a touch input on a touch sensor, such as the touch sensor associated with the control. For example, a touch input at a first location on the touch sensor may result in a first haptic output, while a touch input at a second location on the touch sensor may result in a second haptic output. Furthermore, a particular gesture on the touch sensor may result in a particular haptic output (or other type of output). For instance, a swipe gesture on the control may result in a first type of haptic output, while a tap on the control (detected by the touch sensor) may result in a second type of haptic output, while a hard press of the control may result in a third type of haptic output.

In addition, the controller 1800 may include one or more communication interfaces 1804 to facilitate a wireless connection to a network and/or to one or more remote systems and/or devices 1805 (e.g., a host computing device executing an application, a game console, etc.). The communication interfaces 1804 may implement one or more of various wireless technologies, such as Wi-Fi, Bluetooth, radio frequency (RF), and so on. It is to be appreciated that the controller 1800 may further include physical ports to facilitate a wired connection to a network, a connected peripheral device, or a plug-in network device that communicates with other wireless networks.

In the illustrated implementation, the handheld controller 1800 further includes one or more processors 1806 and computer-readable media 1808. In some implementations, the processors(s) 1806 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1806 may possess its own local memory, which also may store program modules, program data, and/or one or more operating systems.

The computer-readable media 1808 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1808 may be implemented as computer-readable storage media ("CRSM"), which may be any available physical media accessible by the processor(s) 1806 to execute instructions stored on the computer-readable media 1808. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1806.

Several modules such as instruction, datastores, and so forth may be stored within the computer-readable media 1808 and configured to execute on the processor(s) 1806. A few example functional modules are shown as stored in the computer-readable media 1808 and executed on the processor(s) 1806, although the same functionality may alternatively be implemented in hardware, firmware, or as a system on a chip (SOC).

An operating system module 1810 may be configured to manage hardware within and coupled to the controller 1800 for the benefit of other modules. In addition, the computer-readable media 1808 may store a network-communications module 1812 that enables the controller 1800 to communicate, via the communication interfaces 1804, with one or more other devices 1805, such as a personal computing device executing an application (e.g., a game application), a game console, a remote server, or the like. The computer-readable media 1808 may further include a game-session database 1814 to store data associated with a game (or other application) executing on the handheld controller or on a computing device to which the controller 1800 couples. The computer-readable media 1808 may also include a device-record database 1816 that stores data associated with devices to which the controller 1800 couples, such as the personal computing device, game console, remote server or the like. The computer-readable media 1808 may further store game-control instructions 1818 that configure the handheld controller 1800 to function as a gaming controller, and universal-control instructions 1820 that configure the controller 1800 to function as a controller of other, non-gaming devices.

In some instances, some or all of the components (software) shown in FIG. 18 could be implemented on another computing device(s) 1805 that is part of a controller system 1807 including the controller. In such instances, the processes and/or functions described herein may be implemented by other computing devices 1805 and/or the controller 1800. By way of example, the controller 1800 may couple to a host PC or console in the same environment and/or a computing device(s)/server and provide the device 1805 with data indicating presses, selections, and so forth received at the controller 1800. The controller 1800, for example, may transmit data indicating locations of the handles or controls on the controller body, or relative to the controller body. The computing device 1805 may determine, based on this data, which controls or functionalities of the controller are permitted for programming the controller or otherwise adjusting gameplay experiences. Such data may be utilized by the computing device(s) 1805 to interpret the data received from the controller 1800 for controlling one or more actions, or causing one or more actions to be performed. In another example, the computing device(s) 1805 may receive information associated with a grip of the user on the controller 1800 for determining which controls to enable (e.g., power), for example. In such instances, the computing device(s) 1805 may then cause one or more actions to be performed, such as transmitting a request to the controller 1800 to disable (e.g., power off) certain controls. However, while a few scenarios are described, the controller 1800 and the computing device(s) 1805 may communicatively couple with one another for transmitting and receiving data such that the controller 1800, the computing device 1805, and/or other devices of the controller system 1807 may perform the operations and processes described herein.

EXAMPLE CLAUSES

1. A controller including: a controller body including: a substantially planar front surface; a left handle portion disposed on a left side of the controller body, the left handle portion including a first recessed region having a first surface angled relative to the substantially planar front surface; and a right handle portion disposed on a right side of the controller body, the right handle portion including a second recessed region having a second surface angled relative to the substantially planar front surface; a first control disposed on the first surface; and a second control disposed on the second surface.

2. The controller of clause 1, further including: a third control disposed on the substantially planar front surface outside of the first recessed region and outside of the second recessed region.

3. The controller of clause 1, wherein: the first control includes at least one of: a first joystick; a first trackpad; a first directional pad (D-pad); or a first button; and the second control includes at least one of: a second joystick; a second trackpad; a second D-pad; or a second button.

4. The controller of clause 3, wherein at least one of: the first control includes the first trackpad; or the second control includes the second trackpad.

5. The controller of clause 1, further including a display disposed on the substantially front planar surface.

6. The controller of clause 1, wherein the first control is disposed on a front of the left handle portion and the second control is disposed on a front of the right handle portion, further including: one or more third controls disposed on a back of the left handle portion, opposite the front of the left handle portion; and one or more fourth controls disposed on a back of the right handle portion, opposite the front of the right handle portion.

7. A controller including: a controller body including: a left side, and a right side, a first handle slidably coupled to the left side of the controller body; a second handle slidably coupled to the right side of the controller body; one or more first controls located proximate to the left side of the controller body; and one or more second controls located proximate to the right side of the controller body.

8. The controller of clause 7, wherein: the controller body further includes a front and a back; the first handle slidably couples to the back of the controller body on the left side; and the second handle slidably couples to the back of the controller body on the right side.

9. The controller of clause 8, wherein: the back of the controller body includes a first channel and a second channel; the first handle includes a first projection configured to engage with the first channel to slidably couple the first handle to the controller body; and the second handle includes a second projection configured to engage with the second channel to slidably couple the second handle to the controller body.

10. The controller of clause 7, wherein: the left side of the controller body includes a first notch for receiving a portion of the first handle; and the right side of the controller body includes a second notch for receiving a portion of the second handle.

11. The controller of clause 7, wherein: the controller body includes a bottom and a top; the left side extends outward, from the bottom to the top; and the right side extends outward, from the bottom to the top.

12. The controller of clause 7, wherein: the one or more first controls extend along the left side of the controller body; and the one or more second controls extend along the right side of the controller body.

13. The controller of clause 7, wherein: the first handle is configured to slide substantially planar relative to the controller body; and the second handle is configured to slide substantially planar relative to the controller body.

14. A controller including: a controller body including: a top, a bottom, a left side, and a right side; a first handle coupled to the controller body at the left side, wherein the first handle is configured to pivot from a stowed state to an extended state at which is first handle is spaced away from the controller body; and a second handle pivotably coupled to the controller body at the right side, wherein the second handle is configured to pivot from a stowed state to an extended state at which is second handle is spaced away from the controller body.

15. The controller of clause 14, wherein when the first handle and the second handle are in the stowed state, the controller includes a generally rectangular shape.

16. The controller of clause 14, wherein: the left side includes: a first portion that extends substantially perpendicular to the bottom; and a second portion that extends outward towards the top; and the right side includes: a first portion that extends substantially perpendicular to the bottom; and a second portion that extends outward towards the top.

17. The controller of clause 14, wherein: the controller body further includes a front and a back; the back of the controller body includes a first receiver and a second receiver; the first handle includes a first projection that pivotably couples to the first receiver; and the second handle includes a second projection that pivotably couples to the second receiver.

18. The controller of clause 14, wherein: the controller body further includes a front and a back; the front of the controller body further includes one or more first controls; and the back of the controller body further includes one or more second controls.

19. The controller of clause 18, further including a display disposed on the front, between the left side and the right side.

20. The controller of clause 14, wherein: the left side of the controller body includes a first winged portion having one or more first controls; and the right side of the controller body includes a second winged portion having one or more second controls.

21. A controller system including: one or more processors; a controller including: a controller body including a left handle portion and a right handle portion; first controls disposed on the left handle portion; second controls disposed on the right handle portion; and sensors disposed within the controller body; and non-transitory computer readable media storing instructions, that when executed by the one or more processors, cause the one or more processors to perform acts including: receiving, from the sensors, data indicating a grip of a user on the let handle portion and the right handle portion; and causing, based at least in part on the data, at least one of: one or more of the first controls to be enabled; or one or more of the second controls to be enabled.

22. The controller system of clause 21, the acts further including causing, based at least in part on the data, at least one of: one or more of the first controls to be disabled; or one or more of the second controls to be disabled.

23. The controller system of clause 22, wherein: the data indicates that the grip of the user is closer to a top of the controller body than a bottom of the controller body; the one or more first controls that are enabled are proximate to the top of the controller body; the one or more second controls that are enabled are proximate to the top of the controller body; the one or more first controls that are disabled are proximate to the bottom of the controller body; and the one or more second controls that are disabled are proximate to the bottom of the controller body.

24. The controller system of clause 21, wherein: the sensors include first sensors and second sensors; the first sensors are disposed at least one of on, in, or within the first handle portion; and the second sensors are disposed at least one of on, in, or within the second handle portion.

25. The controller system of clause 21, wherein the sensors include capacitive sensors.

26. The controller system of clause 21, the acts further including: receiving, from the sensors, additional data indicating an additional grip of the user on the left handle portion and the right handle portion, wherein the additional data is received subsequent to the data; and causing, based at least in part on the additional data, at least one of: the one or more of the first controls to be enabled; or the one or more of the second controls to be enabled.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A controller system comprising:
one or more processors;
a controller comprising:
a controller body having a front surface;
a first control disposed on the front surface and within a particular half of the front surface, the particular half comprising a left half of the front surface or a right half of the front surface;
a sensor disposed in or on the first control and configured to detect an object in proximity to the first control; and
a second control disposed on the front surface and within the particular half of the front surface; and
non-transitory computer readable media storing instructions, that when executed by the one or more processors, cause the one or more processors to perform acts comprising:
receiving, from the sensor, data indicating that the object is hovering over the first control; and
causing the second control to be disabled based at least in part on the data.

2. The controller system of claim 1, wherein:
the acts further comprise determining, based at least in part on the data, that a value sensed by the sensor satisfies a threshold indicating that the object moved over the first control; and
the causing of the second control to be disabled is based on the value satisfying the threshold.

3. The controller system of claim 1, wherein:
the first control comprises at least one of a joystick or a directional pad; and
the second control comprises a trackpad.

4. The controller system of claim 1, wherein:
the controller further comprises a display;
the first control comprises a trackpad;
the acts further comprise changing a mode of a user interface presented on the display to a mouse mode based at least in part on the causing of the second control to be disabled; and
in the mouse mode, movement of the object on the trackpad causes corresponding movement of a pointer on the display.

5. The controller system of claim 1, wherein:
the first control is positioned on the front surface at a first distance from a side edge of the controller body; and
the second control is positioned on the front surface at a second distance from the side edge of the controller body, the second distance less than the first distance.

6. The controller system of claim 1, wherein:
the controller body comprises:
a handle portion; and
an array of sensors spatially distributed across the handle portion;
the acts further comprise receiving, from the array of sensors, second data indicating a position of a hand on the handle portion; and
the causing of the second control to be disabled is further based on the second data.

7. The controller system of claim 6, wherein:
the controller body has a top edge, a bottom edge, a left handle portion, and a right handle portion;
the handle portion is at least one of the left handle portion or the right handle portion;
the second data indicates that the position of the hand is closer to the top edge than the bottom edge;
the first control is positioned on the front surface at a first distance from the top edge; and
the second control is positioned on the front surface at a second distance from the top edge, the second distance greater than the first distance.

8. A method comprising:
receiving, by a processor, data from a sensor associated with a first control disposed on a particular half of a front surface of a controller body of a controller, the data indicating that an object is hovering over the first control, wherein the particular half comprises a left half of the front surface or a right half of the front surface; and
causing, by the processor, a second control to be disabled based at least in part on the data, the second control disposed on the particular half of the front surface.

9. The method of claim 8, wherein:
the method further comprises determining, based at least in part on the data, that a value sensed by the sensor satisfies a threshold indicating that the object moved over the first control; and
the causing of the second control to be disabled is based on the value satisfying the threshold.

10. The method of claim 8, wherein the first control comprises a joystick, the method further comprising changing a mode of a user interface presented on a display of the controller to a selector mode based at least in part on the causing of the second control to be disabled, wherein, in the selector mode, movement of the joystick causes a selector to toggle between user interface elements presented on the display.

11. The method of claim 8, further comprising receiving, from an array of sensors spatially distributed across a handle portion of the controller body, second data indicating a position of a hand on the handle portion,
wherein the causing of the second control to be disabled is further based on the second data.

12. The method of claim 11, wherein:
the handle portion is at least one of a left handle portion or a right handle portion;
the second data indicates that the position of the hand is closer to a bottom edge of the controller body than a top edge of the controller body;
the first control is positioned on the front surface at a first distance from the top edge; and
the second control is positioned on the front surface at a second distance from the top edge, the second distance less than the first distance.

13. A controller system comprising:
one or more processors;
a controller comprising:
a first control;
a sensor associated with the first control and configured to detect an object in proximity to the first control; and
a second control; and
non-transitory computer readable media storing instructions, that when executed by the one or more processors, cause the one or more processors to perform acts comprising:
receiving, from the sensor, data indicating that the object is hovering over the first control; and
causing the second control to be disabled based at least in part on the data.

14. The controller system of claim 13, wherein:
the sensor comprises a capacitive sensor disposed in or on the first control; and the data comprises capacitance data indicating a change in capacitance based on the object moving over the first control.

15. The controller system of claim 13, wherein:

the acts further comprise determining, based at least in part on the data, that a value sensed by the sensor satisfies a threshold indicating that the object moved over the first control; and the causing of the second control to be disabled is based on the value satisfying the threshold.

16. The controller system of claim 13, wherein:

the first control comprises at least one of a joystick or a directional pad; and the second control comprises a trackpad.

17. The controller system of claim 13, wherein:

the controller further comprises a controller body having a front surface; and the first control and the second control are disposed on the front surface of the controller body and within at least one of a left half of the front surface or a right half of the front surface.

18. The controller system of claim 17, wherein:

the first control is positioned on the front surface at a first distance from a side edge of the controller body; and the second control is positioned on the front surface at a second distance from the side edge of the controller body, the second distance less than the first distance.

19. The controller system of claim 13, wherein:

the controller further comprises:

a controller body having a handle portion; and an array of sensors spatially distributed across the handle portion;

the acts further comprise receiving, from the array of sensors, second data indicating a position of a hand on the handle portion; and the causing of the second control to be disabled is further based on the second data.

20. The controller system of claim 19, wherein:

the controller body has a front surface, a top edge, a bottom edge, a left handle portion, and a right handle portion;

the handle portion is at least one of the left handle portion or the right handle portion;

the second data indicates that the position of the hand is closer to the top edge than the bottom edge;

the first control is positioned on the front surface at a first distance from the top edge; and the second control is positioned on the front surface at a second distance from the top edge, the second distance greater than the first distance.

* * * * *